(12) United States Patent
Portase et al.

(10) Patent No.: US 12,321,450 B2
(45) Date of Patent: Jun. 3, 2025

(54) ANTIMALWARE SYSTEMS AND METHODS USING OPTIMAL TRIGGERING OF ARTIFICIAL INTELLIGENCE MODULES

(71) Applicant: Bitdefender IPR Management Ltd., Nicosia (CY)

(72) Inventors: Radu M. Portase, Cluj-Napoca (RO); Botond Fulop, Cluj-Napoca (RO); Gheorghe F. Hajmasan, Cluj-Napoca (RO)

(73) Assignee: Bitdefender IPR Management Ltd., Nicosia (CY)

( * ) Notice: Subject to any disclaimer, the term of this patent is extended or adjusted under 35 U.S.C. 154(b) by 364 days.

(21) Appl. No.: 18/177,396

(22) Filed: Mar. 2, 2023

(65) Prior Publication Data
US 2024/0296222 A1  Sep. 5, 2024

(51) Int. Cl.
G06F 21/56 (2013.01)

(52) U.S. Cl.
CPC ........ G06F 21/56 (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 8,776,231 B2 | 7/2014 | Moskovitch | |
| 9,306,962 B1 | 4/2016 | Pinto | |
| 10,089,465 B2 | 10/2018 | Hajmasan | |
| 10,282,546 B1* | 5/2019 | Parikh | G06N 3/084 |
| 10,417,420 B2 | 9/2019 | Zhang | |
| 10,867,042 B2 | 12/2020 | Chistyakov | |
| 10,922,604 B2* | 2/2021 | Zhao | G06F 21/563 |
| 10,949,534 B2 | 3/2021 | Martin | |
| 11,025,649 B1* | 6/2021 | Bilge | G06F 21/566 |
| 11,089,034 B2 | 8/2021 | Dichiu | |
| 11,126,720 B2* | 9/2021 | Miserendino | G06N 5/025 |
| 11,153,332 B2 | 10/2021 | Dichiu | |
| 11,288,369 B1* | 3/2022 | Grzonkowski | G06F 21/57 |
| 11,323,459 B2 | 5/2022 | Dichiu | |

(Continued)

OTHER PUBLICATIONS

European Patent Office (EPO), International Search Report and Written Opinion mailed May 8, 2024 for PCT International Application No. PCT/EP2024/055331, international filing date Mar. 1, 2024, earliest priority date Mar. 2, 2023.

(Continued)

*Primary Examiner* — Christopher C Harris
(74) *Attorney, Agent, or Firm* — Law Office of Andrei D Popovici, PC

(57) ABSTRACT

Some embodiments determine optimal trigger events for executing a malware-detecting artificial intelligence (AI) module by tracking a performance of the respective module over a lifetime of each software sample of a training corpus. Computational costs associated with the respective AI module may be substantially reduced by executing the respective module only sporadically, in response to detecting an occurrence of one of the identified trigger events. In some embodiments, a malware detector employs multiple AI modules, each having its own specific triggers. The choice of triggers may be updated at any time, without affecting other aspects of the malware detector.

21 Claims, 11 Drawing Sheets

(56) References Cited

U.S. PATENT DOCUMENTS

| | | | |
|---|---|---|---|
| 11,501,120 B1* | 11/2022 | Petersen | G06N 3/045 |
| 11,843,622 B1* | 12/2023 | Tellez | H04L 63/1425 |
| 11,997,131 B1* | 5/2024 | Sirianni | G06N 3/04 |
| 2009/0007100 A1 | 1/2009 | Field | |
| 2013/0247187 A1* | 9/2013 | Hsiao | G06F 21/56 |
| | | | 726/22 |
| 2013/0304677 A1 | 11/2013 | Gupta | |
| 2014/0187177 A1 | 7/2014 | Sridhara | |
| 2015/0013007 A1 | 1/2015 | Hartrell | |
| 2016/0078362 A1* | 3/2016 | Christodorescu | G06N 20/10 |
| | | | 706/12 |
| 2017/0262633 A1 | 9/2017 | Misrendino | |
| 2018/0018456 A1* | 1/2018 | Chen | G06F 21/552 |
| 2018/0041536 A1* | 2/2018 | Berlin | H04L 63/1416 |
| 2018/0060569 A1* | 3/2018 | Kim | G06F 21/55 |
| 2019/0034634 A1 | 1/2019 | Hajmasan | |
| 2019/0228154 A1* | 7/2019 | Agrawal | G06N 3/047 |
| 2020/0167464 A1* | 5/2020 | Griffin | G06F 21/563 |
| 2020/0265139 A1 | 8/2020 | Zhao | |
| 2020/0311262 A1* | 10/2020 | Nguyen | G06F 21/554 |
| 2021/0019412 A1 | 1/2021 | Hewlett | |
| 2021/0037035 A1* | 2/2021 | Graul | H04L 41/14 |
| 2021/0326438 A1 | 10/2021 | Dichiu | |
| 2021/0334371 A1* | 10/2021 | Ke | G06N 5/01 |
| 2022/0121744 A1 | 4/2022 | Mishra | |
| 2022/0164449 A1 | 5/2022 | Saxe | |
| 2022/0253526 A1* | 8/2022 | Sanders | G06N 3/08 |
| 2023/0281315 A1* | 9/2023 | Capellman | G06F 21/577 |
| | | | 726/25 |
| 2023/0344843 A1* | 10/2023 | Zaytsev | H04L 63/145 |
| 2024/0004993 A1* | 1/2024 | Rozenberg | G06F 21/554 |
| 2024/0031387 A1* | 1/2024 | Reynolds | H04L 63/1425 |

OTHER PUBLICATIONS

Darem et al., "An Adaptive Behavioral-Based Incremental Batch Learning Malware Variants Detection Model Using Concept Drift Detection and Sequential Deep Learning,", IEEE Access vol. 9 p. 97180-97196,, https://ieeexplore.ieee.org/stamp/stamp.jsp?tp=&arnumber=9467300, Jun. 29, 2021.

Darem et al., "An Adaptive Behavioral-Based Incremental Batch Learning Malware Variants Detection Model Using Concept Drift Detection and Sequential Deep Learning,".

* cited by examiner

ANTIMALWARE SYSTEMS AND METHODS USING OPTIMAL TRIGGERING OF ARTIFICIAL INTELLIGENCE MODULES

BACKGROUND OF THE INVENTION

The invention relates to computer security, and in particular to employing artificial intelligence to detecting malicious software.

Malicious software, also known as malware, affects a great number of computer systems worldwide. In its many forms such as computer viruses, worms, rootkits, unsolicited adware, ransomware, and spyware, malware presents a serious risk to millions of computer users, making them vulnerable to extortion, loss of data and sensitive information, identity theft, and loss of productivity, among others. Malware may further display material that is considered by some users to be obscene, excessively violent, harassing, or otherwise objectionable. The explosive growth in mobile computing has only exacerbated exposure and the associated risks, with millions of devices such as smartphones and tablet computers constantly connected to the Internet and acting as potential targets for malware.

Security software may be used to detect malware infecting a user's computer system, and additionally to remove or prevent the execution of such malware. Several malware-detection techniques are known in the art. Modern methods exploit recent developments in artificial intelligence (AI) and machine learning (ML) and rely on artificial neural networks pre-trained on corpora of known malicious and clean samples. In a typical example, a neural network receives a vector of feature values characterizing a target software entity and outputs a label indicating whether the respective target software is malicious.

Despite their advantages, such AI systems face significant technical challenges. One example is the choice of input features. Typically, there are no obvious or universal criteria for choosing which features of target software are more likely to reveal malice and/or to differentiate between malicious and benign behavior. Another challenge facing AI-implemented anti-malware solutions is the availability of the input features. Stated otherwise, even when a relevant feature set is known, some of the respective features may not be available at all times and/or on all client devices. This is particularly true for mobile computing platforms such as smartphones and wearables, among others, wherein extracting or evaluating certain features may require specific permissions from the user.

To address the feature selection and availability problems, some conventional approaches increase the count of features and therefore the size of AI models in an attempt to improve their performance. However, large neural networks are notoriously costly to train and typically require large training corpora which are difficult to acquire, annotate, and maintain. Furthermore, implementing and executing large AI models on some client systems such as mobile computing devices may generate substantial computational overhead and negatively impact user experience.

For all the reasons outlined above, there is considerable effort and sustained interest in developing robust and scalable computer security systems and methods capable of quickly and efficiently responding to emerging threats.

SUMMARY OF THE INVENTION

According to one aspect, a computer system comprises at least one hardware processor configured to determine a trigger event for executing a malware-detecting artificial intelligence (AI) module. Determining the trigger event comprises determining a plurality of provisional verdicts indicative of whether a training software entity is malicious, each verdict of the plurality of provisional verdicts associated with a distinct event of a plurality of events caused by an execution of the training software entity. Determining each verdict comprises updating a feature vector characterizing the training software entity according to the distinct event and executing the AI module to determine a respective verdict according to the updated feature vector. Determining the trigger event further comprises in response to determining the plurality of provisional verdicts, selecting the trigger event from the plurality of events according to the plurality of provisional verdicts. The at least one hardware processor is further configured, in response to determining the trigger event, to configure a malware detector to selectively execute another instance of the AI module in response to an occurrence of the trigger event, to determine whether a target software entity is malicious.

According to another aspect, a computer security method comprises employing at least one hardware processor of a computer system to determine a trigger event for executing a malware-detecting AI module. Determining the trigger event comprises determining a plurality of provisional verdicts indicative of whether a training software entity is malicious, each verdict of the plurality of provisional verdicts associated with a distinct event of a plurality of events caused by an execution of the training software entity. Determining each verdict comprises updating a feature vector characterizing the training software entity according to the distinct event and executing the AI module to determine a respective verdict according to the updated feature vector. Determining the trigger event further comprises in response to determining the plurality of provisional verdicts, selecting the trigger event from the plurality of events according to the plurality of provisional verdicts. The method further comprises, in response to determining the trigger event, employing the at least one hardware processor to configure a malware detector to selectively execute another instance of the AI module in response to an occurrence of the trigger event, to determine whether a target software entity is malicious.

According to another aspect, a non-transitory computer-readable medium stores instructions which, when executed by at least one hardware processor of a computer system, cause the computer system to determine a trigger event for executing a malware-detecting AI module. Determining the trigger event comprises determining a plurality of provisional verdicts indicative of whether a training software entity is malicious, each verdict of the plurality of provisional verdicts associated with a distinct event of a plurality of events caused by an execution of the training software entity. Determining each verdict comprises updating a feature vector characterizing the training software entity according to the distinct event and executing the AI module to determine a respective verdict according to the updated feature vector. Determining the trigger event further comprises in response to determining the plurality of provisional verdicts, selecting the trigger event from the plurality of events according to the plurality of provisional verdicts. The instructions further cause the computer system, in response to determining the trigger event, to configure a malware detector to selectively execute another instance of the AI module in response to an occurrence of the trigger event, to determine whether a target software entity is malicious.

BRIEF DESCRIPTION OF DRAWINGS

The foregoing aspects and advantages of the present invention will become better understood upon reading the following detailed description and upon reference to the drawings where.

DETAILED DESCRIPTION OF THE INVENTION

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Any use of 'or' is meant as a nonexclusive or. Unless otherwise required, any described method steps need not be necessarily performed in a particular illustrated order. A first element (e.g., data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. Unless otherwise specified, a process is an instance of a computer program and is characterized by having at least an execution thread and a virtual memory space assigned to it, wherein a content of the respective virtual memory space includes executable code. The term "database" is used herein to denote any organized, searchable collection of data. The term "predicate" denotes a statement that has a variable degree of truth depending on the values of its variables. Evaluating a predicate comprises determining the truth value of the respective predicate. Computer-readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
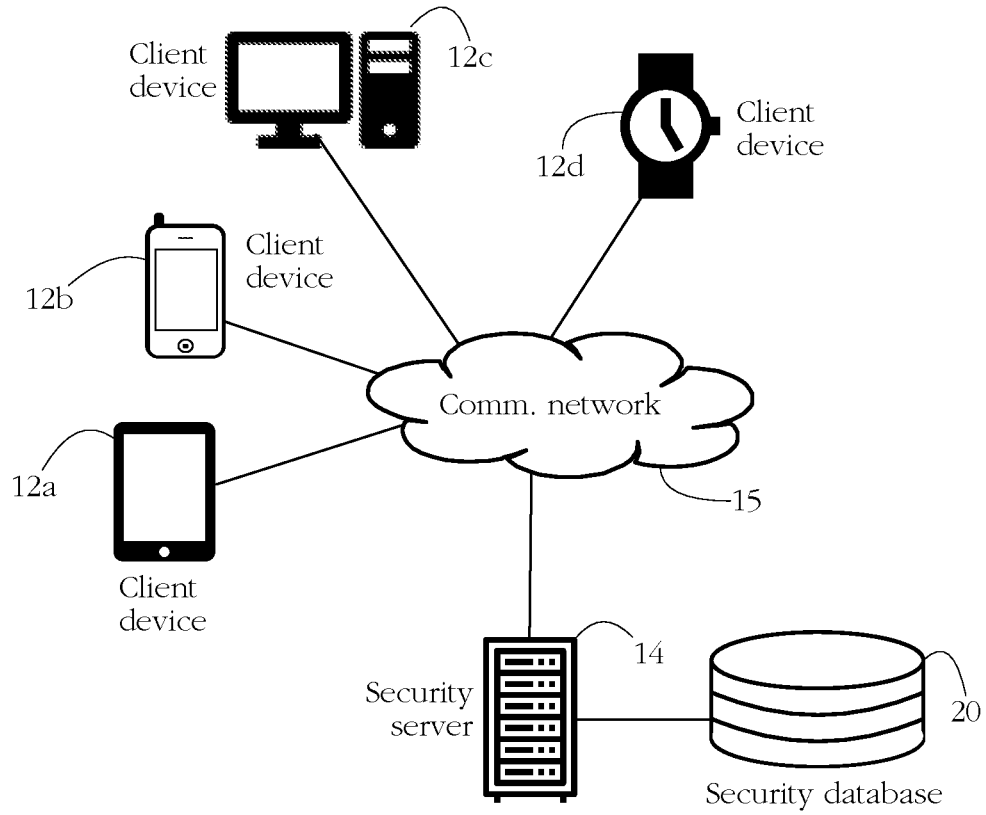
FIG. 1 shows a plurality of client devices protected from malware according to some embodiments of the present invention.

FIG. 1 shows a plurality of client devices 12a-d protected against malware according to some embodiments of the present invention. Exemplary client devices 12a-d include personal computer systems, corporate mainframe computers, mobile computing platforms (e.g., laptop computers, tablets, smartphones), entertainment devices (e.g., TVs, game consoles), wearable devices (e.g., smartwatches, fitness bands), household appliances (e.g., thermostats, refrigerators), and any other electronic device comprising a processor, a memory, and a communication interface enabling the respective device to communicate with other devices/computer systems. In some embodiments, each client device 12a-d includes a security module configured to detect malicious software. The security module may be embodied as a software application executing on a processor of the respective device.

Client devices 12a-d are connected to a communication network 15, which may include a local area network (e.g., home network, corporate network, etc.), a wide-area network and/or the Internet. Network 15 generically represents a set of hardware (physical layer) and software interfaces enabling the transfer of data between devices 12a-d and other entities connected to network 15.

FIG. 1 further shows a security server 14 connected to communication network 15. Server 14 generically represents a set of communicatively coupled computer systems, which may or may not be in physical proximity to each other. In some embodiments as described below, security modules executing on each client device 12a-d may collaborate with server 14 to protect each respective device. Stated otherwise, computer security activities may be divided between a component of the respective device and server 14. Server 14 may protect multiple client devices 12*a-d*, for instance according to a service agreement/subscription, etc.

Figure 2:
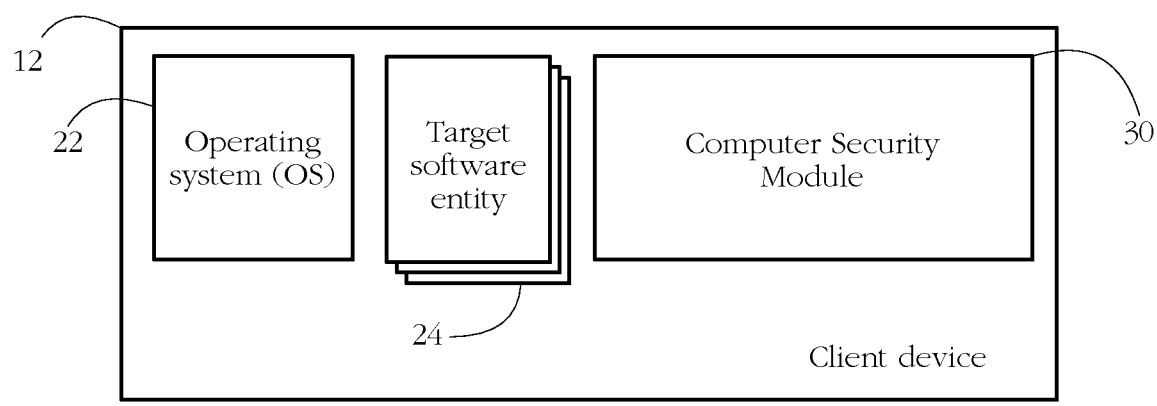
FIG. 2 illustrates exemplary software executing on a client device according to some embodiments of the present invention.

FIG. 2 shows exemplary software executing on a client device 12, which generically represents any of the client devices 12*a-d* in FIG. 1. An operating system (OS) 22 provides an interface between the hardware of client device 12 and other computer programs executing on the respective device. Exemplary operating systems include, among others, Windows®, Linux®, iOS®, and Android®.

In some embodiments, a computer security module 30 protects client device 12 against computer security threats such as malicious software and intrusion. The following description will focus on exemplary embodiments wherein module 30 comprises a set of computer programs, i.e., software executing on a processor of client device 12. However, a skilled artisan will know that the present description may be adapted to alternative embodiments wherein module 30 is implemented in hardware or a combination of hardware and software, without affecting the scope of the present invention. Module 30 may form a part of a larger security suite also providing traffic control (e.g., firewall, parental control) and spam control services, among others.

In some embodiments, computer security module 30 is configured to monitor the behavior of a target software entity 24 to determine whether entity 24 is malicious. In some embodiments, monitoring the behavior of software comprises detecting a set of events caused by the execution of the respective software and analyzing the respective events as shown in detail below. A single instance of security module 30 may be configured to monitor multiple (e.g., hundreds) of target entities 24 concurrently.

Target software entity 24 generically represents any computer program, such as word processing, image processing, spreadsheet, calendar, gaming, social media, web browser, and electronic communication applications, among others. In some embodiments, entity 24 comprises an individual computer process. Alternatively, entity 24 may comprise a group of processes related by filiation and/or code injection relations, as described for instance in U.S. Pat. No. 10,706,151 B2, by G. Hajmasan et. al., titled "Systems and Methods for Tracking Malicious Behavior Across Multiple Software Entities". In such embodiments, an event caused by any member of a group of related processes may be considered to represent a behavior of the group. The composition of entity 24 may change in time, as some constituent processes are terminated and/or others are added following spawning and/or injection. In some embodiments, a target software entity 24 may be monitored even after some of its constituent processes have terminated, as long at entity 24 still comprises at least one live process.

Figure 3:
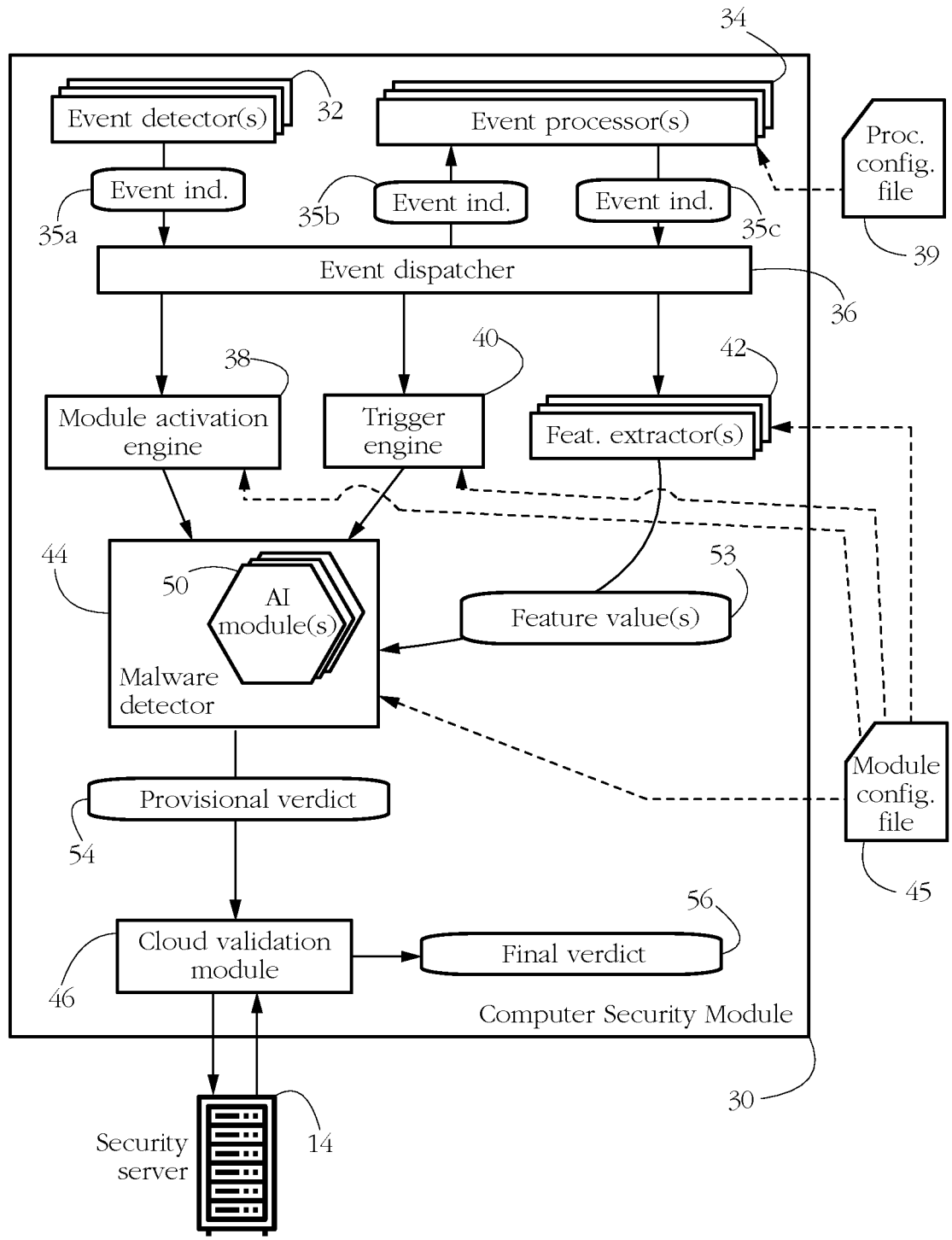
FIG. 3 shows exemplary components of a computer security module according to some embodiments of the present invention.

FIG. 3 shows exemplary components of security module 30 according to some embodiments of the present invention. Module 30 comprises a malware detector 44 using artificial intelligence (AI) technology to determine whether target entity 24 is malicious. In exemplary embodiments, malware detector 44 implements a plurality of AI modules 50, and may selectively execute modules 50 when triggered by the occurrence of specific events caused by the execution of target entity 24.

Figure 4:
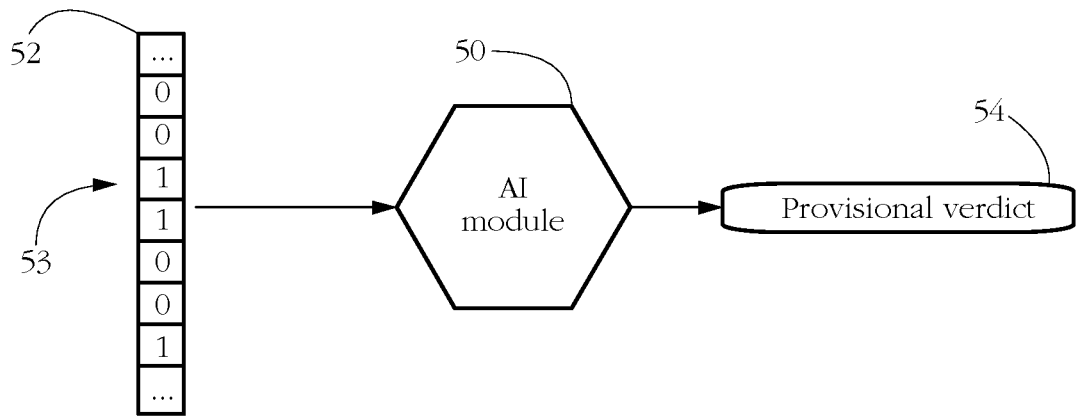
FIG. 4 illustrates an exemplary artificial intelligence (AI) module receiving an input feature vector and outputting a provisional security verdict according to some embodiments of the present invention.

In some embodiments as illustrated in FIG. 4, each AI module 50 is configured to input a feature vector 52 and to output a provisional verdict 54 determined according to feature vector 52 and indicative of whether target entity 24 is malicious. Each target entity 24 is characterized by its own feature vector 52 including a plurality of feature values 53 comprising values of various features/attributes of the respective target entity. Such features herein refer broadly to any attribute known in the art of computer security, that can be used to determine whether client device 12 comprises malicious software. Some features may be static, i.e., their value may not change during the lifetime of the respective target entity. Examples of static features include a filename, a type of entity (e.g., Windows® executable vs. Microsoft Word® file), a content of a section of memory, a content of a file or folder (e.g., an Android® manifest file), an OS setting, a text displayed to a user, various features of an image displayed by target application 24 on a screen of client device 12, etc. Other features may be behavioral/dynamic in the sense that they characterize a set of actions of the respective entity, such as opening a file, changing an access permission, launching a child process, injecting code into another software entity, sending an electronic communication (e.g., an HTTP request for a remote resource), etc. Some characteristic features may be malware-indicative on their own; others may indicate malice only when evaluated together with other features. Yet other characteristic features may indicate that the respective entity is benign. One such example comprises an entity's being digitally signed by its creator; such signatures often work as marks of authenticity and cleanliness.

The composition of feature vector 52 (i.e., set of characteristic features) may be specific to each respective AI module 50. Stated otherwise, each AI module 50 may determine whether entity 24 is malicious according to a distinct "viewpoint", i.e., a distinct set of features and criteria. However, some features may be shared among multiple AI modules, as further described below. Although feature vector 52 illustrated in FIG. 4 comprises only Boolean values, a skilled artisan will know that this aspect is not meant to be limiting. Other exemplary feature values 53 may include numbers, character strings, etc. Similarly, provisional verdict 54 may comprise a Boolean value (e.g., malicious/clean) or a number indicating a likelihood/probability that the respective entity 24 is malicious. In yet other exemplary embodiments, verdict 54 may comprise a plurality of values, each value indicating a likelihood that entity 24 belongs to a respective class/category of malicious behavior (e.g., ransomware, exfiltrator, etc.).

AI modules 50 may be implemented using any method known in the art of artificial intelligence and machine learning. For instance, an AI module may comprise a set of pre-trained artificial neural networks (NN). Several NN architectures as well as strategies for training NNs as malware detectors are known in the art. Simple examples include feed-forward networks, perceptrons, support vector machines and decision forests. Another exemplary NN known as an autoencoder can be trained to perform lossy compression and subsequent recovery of a set of feature values. Some embodiments may train the autoencoder on data obtained during execution of benign software, and use a mismatch between the input and output of the autoencoder as an indicator of anomalous and therefore possibly malicious software behavior. Some AI modules 50 may employ neural networks specialized in text and natural language processing to analyze features extracted from software configuration files, event logs, Android® manifest files, and/or user interfaces. Such modules may implement recurrent neural networks (RNN) and long short term memory (LSTM) architectures, among others. Other exemplary AI modules 50 may employ NNs specialized in image processing (such as convolutional neural networks, among others) to analyze screen snapshots and/or image files received or sent out by the respective client device. Specific architectural and functional details of such NNs go beyond the scope of the present description.

In some embodiments, feature values 53 are provided by a plurality of feature extractors 42 which may be embodied as computer programs executing on a processor of client device 12. Evaluating static features may include, for instance, feature extractors 42 accessing OS-specific data structures such as a Windows® registry to read current values of various settings, scanning various files and/or regions of memory for specific content (e.g., malware signature matching by way of hashing or other methods), etc. Evaluating dynamic/behavioral features may include determining whether target entity 24 has performed a specific action and updating feature values 53 accordingly. The execution of extractors 42 may be selectively triggered by the occurrence of various events, as described in detail below.

In some embodiments, hardware and software events are detected by an event processing infrastructure comprising a set of event detectors 32, a set of event processors 34, and an event dispatcher connected to event detectors 32 and event processors 34. The event processing infrastructure may comprise any implementation of a message delivery system. For instance, components 32-34-36 may register callbacks to be notified whenever a specific event occurs on client device 12, and further associate each event with a software entity causing the respective event.

Event detectors 32 comprise hardware and/or software devices configured to detect various events occurring during execution of software on client device 12. Some detectors 32 may specialize in detecting particular types or categories of events. Exemplary detected events include application installs, uninstalls, and updates, process/application launches and terminations, the spawning of child processes (e.g., forking), dynamic loading/unloading of a library, execution of a particular processor instruction (e.g., system call), file events such as file creation, write, deletion, etc., and setting various OS parameters (e.g., Windows® registry events, permission/privilege changes), among others. Other exemplary detected events may include receiving a request to access a peripheral device (e.g., hard disk, SD card, network adapter, microphone, camera), receiving an incoming communication (e.g., a short message service-SMS message), a request to access a remote resource (e.g., a hypertext transfer protocol-HTTP request to access a particular URL, an attempt to access a document repository over a local network), a request formulated in a particular uniform resource identifier scheme (e.g., a mailto: or an ftp: request), and an attempt to send an electronic message (e.g., email, SMS, etc.), among others. Yet other exemplary events comprise moving a user interface/window of target application 24 in and/or out of focus/foreground.

Some embodiments of event detectors 32 may further detect various timing-related events, such as periods of inactivity, i.e., time gaps between events and/or time intervals when the respective client device is idle, registers no user activity, or carries out only internal system tasks. Such inactive periods may be further differentiated into short time gaps (e.g., of the order of a seconds) and long time gaps (e.g., of the order of minutes to hours). Other timing-related events may include, for instance, a sequence of events occurring in quick succession/bursts of activity.

Exemplary events specific to, or particularly relevant to the security of, mobile devices include screen toggles (on/off), a change in the label/name/icon of an application, and a screen grab. Other examples include a request to grant a specific type of permission (e.g., admin, accessibility), permissions requested dynamically (i.e., during various stages of execution, as opposed to at installation), and granting persistency (e.g., a foreground service started dynamically by the respective application). Yet other examples include an attempt to prevent an uninstall of the respective application and displaying an overlay on top of an OS settings interface (such an overlay may trick an unsuspecting user into granting the respective application unwanted permissions).

Such event detection may be device-type-specific. In one example wherein client device 12 is a personal or laptop computer, upon detecting a creation of target entity 24, event detectors 32 registers the respective entity and/or its associated set of processes with an event logging service of OS 22 (e.g., event tracking for Windows®-ETW, Syslog in UNIX®). In response, event detectors 32 may receive notifications of various events occurring during execution of the respective processes, either in real time or in log form. Event logging tools typically generate a list of event descriptors including a timestamp for each event, a numerical code identifying an event type, an indicator of a type of process or application that generated the respective event, and other event parameters. In such embodiments, detectors 32 may detect the occurrence of a target event by parsing the respective event log.

In another example, a specialized event detector 32 may modify a set of native functions of OS 22 by inserting redirecting instructions (also known as hooks or patches). In this manner, when a process executing on client device 12 calls the respective OS function, execution is redirected to a callback routine notifying detector 32 of an attempt to execute the respective OS function. When the hooked function is instrumental in a monitored event (e.g., file creation, process launch, etc.), an attempt to call the respective function may serve as an indicator of the occurrence of the respective event.

In yet another example of event detection, electronic communications sent by the respective client device may be detected by installing a specialized event detector 32 as a proxy module configured to intercept domain name service (DNS) queries and/or HTTP requests transmitted by the client device 12.

Some operating systems such as those executing on smartphones, wearables, etc., may not allow such manipulations. However, other tools may be available to detect the occurrence of various events. For instance, some OSs expose an application programming interface (API) that enables registering callbacks for different notifications, inspecting network traffic, SMS/MMS manipulation, detecting access to storage devices (e.g., SD card), etc. Some embodiments of event detectors 32 use functions of an accessibility API to access on-screen content and detect user interactions with the respective device and/or applications.

In some embodiments, event detectors 32 notify event dispatcher 36 in response to the occurrence of a respective event, for instance by transmitting an event indicator 35*a* (FIG. 3). Dispatcher 36 is configured to centralize event notifications from detectors 32 and distribute or otherwise make such information accessible to other components of computer security module 30. Dispatcher 36 is further configured to maintain a mapping/association between each detected event and a target software entity causing the respective event. Data associating each event with a target entity may be provided by event detectors 32 and/or event processors 34. In some embodiments, dispatcher 36 stores and/or manages individual events as data structures containing fields/attributes that can be strings, integers, booleans, or bitmaps of flags.

In some embodiments, events may be organized on several semantic levels. Some event detectors 32 may only provide low-level, raw and/or unstructured data. In some embodiments, a set of event processors 34 is configured to analyze and/or aggregate such primary data to infer the occurrence of higher-level events. As such, event processors 34 may receive event indicators 35b via dispatcher 36 and contribute other event notifications 35c to dispatcher 36 with (FIG. 3). In one example, an event processor 34 may add attribute values to an event detected by detectors 32. For instance, when event indicator 35b communicates receiving an SMS, an exemplary event processor may determine whether the respective SMS includes a hyperlink and return such information in updated event indicator 35c. In a more sophisticated example, event processors 34 may use artificial intelligence (e.g., natural language processing, computer vision, etc.) or other means of analyzing a content displayed on screen, to determine whether target entity 24 is displaying a login form, a payment interface, an advertisement, etc. In yet another example, some event processors 34 may combine information about multiple events to determine whether an aggregate, higher-level event has occurred.

Event processors 34 may be organized in multiple layers, so that the output of one layer is further fed to event processors in another layer. Such hierarchical event processing architectures may characterize detected events efficiently and with customizable granularity and complexity. In some embodiments, distinct event processing layers may correspond to different event semantic levels. For instance, distinct processing layers may essentially respond to different questions, such as how, what, and why a target entity has performed a specific action. In one such example, the event processing infrastructure of security module 30 is configured to detect an event comprising copying a file to a Windows® startup folder. To perform such an operation, target entity 24 may for instance:

A. Call the CopyFile function of the Windows® API
B. Copy chunks of the respective file using a sequence of file read and write commands.
C. Use the COM object IFileOperation::Copy Item to copy the file.

Event detectors 32 may signal the occurrence of low-level events, e.g., an attempt to execute the CopyFile instruction (case A), individual file read and/or writes (case B), a COM call to IFileOperation (case C). A set of event processors 34 may consume such low-level events to determine whether they are indicative of a higher-level file copy event. For instance, in case B, some processors 34 may aggregate multiple detected read/write events and determine whether they involve chunks of the same file. When yes, the respective event processors may transmit event indicator 35c notifying event dispatcher of the occurrence of a file copy event. Another event processor 34 may then ingest the file copy event and determine whether it is indicative of an attempt to copy a file into the startup folder, and when yes, generate another event indicator notifying dispatcher 36 accordingly.

In some embodiments, to save computing resources, some event processors 34 may be selectively activated and/or de-activated, for instance according to a type of target entity 24. A selected processor 34 may also be de-activated for instance when no other event processor, feature extractor 42, or AI module 50 currently uses its output. Some embodiments may use an event processor configuration file 39 to specify inter-dependencies between event processors 34 and/or to specify which event processors 34 should be active/inactive according to each type of target entity. Configuration file 39 may be formulated using any data specification standard known in the art, for instance in a version of extensible markup language (XML) or JavaScript® Object Notation (JSON).

The manner in which event information is dispatched to event processors 34 and/or other components of module 30 may vary among embodiments and event types. Exemplary dispatch mechanisms include, for instance, fast dispatch, synchronous dispatch, and/or asynchronous dispatch. In fast dispatch, events are submitted directly to event processors 34 without locking or extra memory allocations. An example comprises dispatching data received from a network traffic sensor registered with a Windows® filtering platform. Event processors 34 ingesting fast dispatch events are typically pre-registered with the associated event detectors, and cannot be dynamically activated or de-activated. In synchronous dispatch, the process/thread causing the respective event is suspended while events are submitted to event processors for analysis, and resumed after the conclusion of the analysis. Thread locking and extra memory allocation further allow event processors 34 to be activated/de-activated dynamically. In asynchronous dispatch, the process/thread causing the respective event is allowed to continue execution, and event notifications are added to a queue ingested by a dedicated processor thread pool. Some event processors 34 and/or detectors 32, for instance handlers of Event Tracing For Windows (ETW) data, may require asynchronous dispatch.

Figure 5:
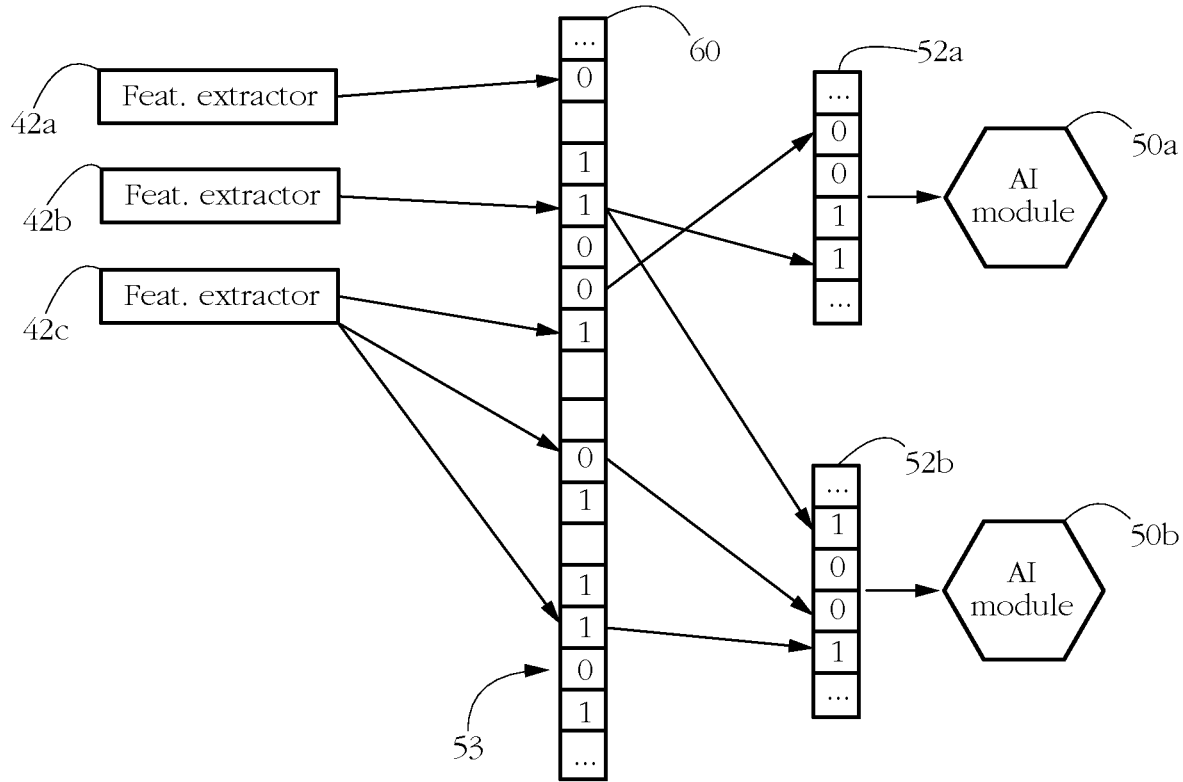
FIG. 5 illustrates a set of exemplary feature vectors and associated feature extractors according to some embodiments of the present invention.

In some embodiments, feature extractors 42 determine a set of feature values 53 characterizing the behavior of each monitored target entity 24. In some embodiments as illustrated in FIG. 5, computer security module 30 maintains a master feature vector 60 for each target software entity 24, vector 60 comprising a plurality of feature values 53 determined by various feature extractors. Exemplary feature extractors 42a-c in FIG. 5 generically represent any of the set of feature extractors 42 in FIG. 3. Master feature vector 60 may be initialized at the launch/creation of the respective target entity 24, for instance to a set of default feature values or to an empty vector. Master feature vector 60 may then evolve during a lifetime of the respective target entity, as the respective entity performs various actions and causes the occurrence of various events that are in turn dispatched to feature extractors 42 as shown above, causing an update of the respective feature values 53. In some embodiments, master feature vector 60 includes a relatively large number (e.g., several hundreds to several thousands) of feature values 53. Stated otherwise, master vector 60 characterizes each target entity 24 using a large number of attributes. Each feature value 53 is contributed by a feature extractor. However, not all extractors 42a-c may be active at all times, so some feature values 53 may be missing or currently undetermined (more details below). In some embodiments as illustrated, a single feature processor may evaluate multiple features/attributes of the target entity, thus contributing multiple feature values 53 to master feature vector 60.

To determine dynamic/behavioral features of entity 24, some embodiments of feature extractors 42 evaluate extractor-specific predicates according to events dispatched by event dispatcher 36. Predicates herein denote statements involving event attributes/fields, such as "Flag F is set", "File name ends in .part", "File size>1 MB", "IP address is blacklisted," etc. Some predicates may comprise multiple other predicates combined using logical operations such as AND, OR, XOR, etc. Evaluating predicates herein comprises determining their truth value. In a simple example, a selected feature value equals the truth value of a respective predicate (e.g., 1 for TRUE, 0 for FALSE).

FIG. 5 further illustrates the relationship between master feature vector 60 and individual AI modules according to some embodiments of the present invention. A set of exemplary AI modules 50a-b generically represent any of the plurality of AI modules 50 in FIG. 3. Each AI module 50a-b receives a respective input feature vector 52a-b. In some embodiments as illustrated, each individual feature vector 52a-b includes only a selected subset of feature values 53 of master feature vector 60, the respective subset specific to the respective AI module. This illustrates the intuitive representation of each AI module evaluating target entity 24 from a different "viewpoint", i.e., using a distinct but possibly overlapping set of attributes to characterize the target entity. In some embodiments, the size of individual feature vectors 52a-b is substantially smaller (e.g., a few dozen to a few hundred) than that of master feature vector 60, which may give some embodiments a performance advantage, as further explained below.

In some embodiments, a module activation engine 38 connected to event dispatcher 36 (FIG. 3) selectively and dynamically activates and/or de-activates AI modules 50 during a lifetime of target entity 24. Stated otherwise, malware detector 44 may effectively use only a limited subset of available AI modules 50 at any time, the respective modules selected according to static features (e.g., an entity type) and/or dynamic features (i.e., a behavior) of target entity 24. Activating and de-activating a selected AI module herein denote adding and removing, respectively, the respective module to/from a malware detection toolset currently available for use by detector 44, and does not mean executing the respective module. As described in more detail below, the actual execution of an AI module is distinct from activation, and is triggered by specific events.

Figure 6:
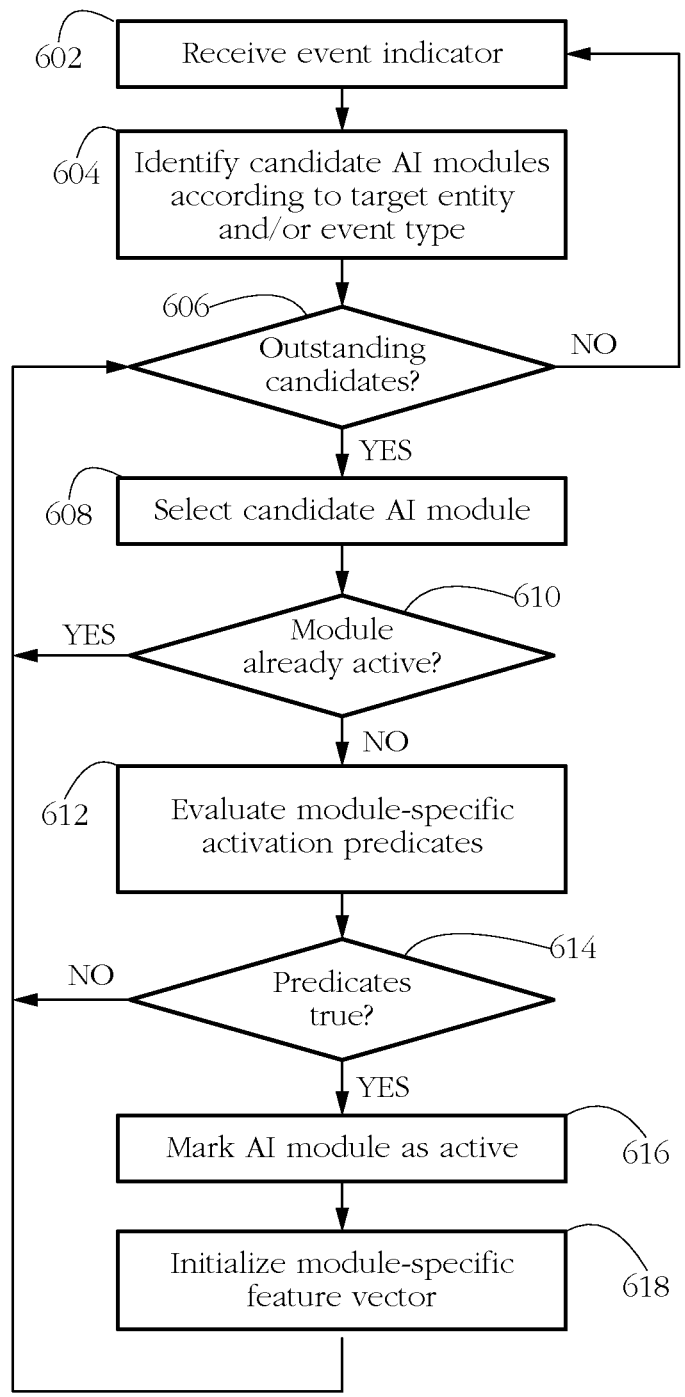
FIG. 6 shows an exemplary sequence of steps performed by a module activation engine according to some embodiments of the present invention.

FIG. 6 shows an exemplary sequence of steps performed by activation engine 38 according to some embodiments of the present invention. As events are detected, processed, and further dispatched to various components, a step 602 receives notification of an event caused by the execution of target entity 24. The respective event may be an entity lifecycle event such as a launch of entity 24, forking of a child process, termination of a process, etc., or a behavior event such as opening a file, receiving data via a network adapter, etc. In a step 604, engine 38 may identify a set of candidate AI modules 50 for activation according to the respective event and/or according to a type of the respective target entity. In one such example, some AI modules may be used for detecting malicious portable executables (e.g., .EXE in Windows®), while other AI modules may be used for detecting malicious Microsoft Word® macros. In another example, a particular type of event may be an indicator of a likelihood of infection with a particular type of malware, e.g., ransomware. Hence, detecting such an event may prompt engine 38 to select for activation an AI module specializing in ransomware detection. In yet another example, an event comprising loading a particular Windows® library may indicate that target entity 24 may include Microsoft Word® macros, and hence prompt selecting a candidate AI module 25 specialized in detecting malicious macros.

Some embodiments maintain an association between event types and AI modules potentially activated or de-activated by the occurrence of events of the respective type, enabling module activation engine 38 to efficiently select candidate AI modules in step 604. The association may be implemented in any manner known in the art. In one exemplary embodiment, each AI module 50 may have an associated module configuration file 45 (FIG. 3) encoding, among others, a data structure (e.g., bitmap) indicating which event types may activate and/or de-activate the respective AI module. Model configuration file 45 may further list a set of entity types that the respective AI module is trained to monitor.

In response to identifying candidate modules, activation engine 38 may cycle through the respective candidates (a sequence of steps 606-608). When the current candidate is not already active (a step 610 returns a NO), in a step 612 engine 38 may evaluate a set of module-specific activation predicates. Such predicates effectively comprise various conditions for activating the respective AI module and may be included in module configuration file 45. One example of a module activation predicate comprises determining whether a library recently loaded by target entity 24 is for processing Microsoft Word® macros.

When activation predicates evaluate to true, i.e., module activation conditions are satisfied (a step 614 returns a YES), a step 616 may mark the respective candidate module as active. In one exemplary embodiment, malware detector 44 may maintain a data structure (e.g., bitmap) associated with each target entity 24, the respective data structure indicating which AI modules are currently activated for the respective entity (e.g., each bit within the activation bitmap may correspond to a distinct AI module 50). In such an embodiment, step 616 may comprise toggling a bit corresponding to the respective candidate within the activation bitmap.

In response to activating the respective candidate AI module, some embodiments initialize the respective module-specific feature vector (see e.g., feature vectors 52a-b in FIG. 5). Such initialization may reset any previously determined feature values. In some embodiments as further described below, activating an AI module further triggers activating a set of module-specific feature extractors configured to populate the respective module's feature vector.

Some embodiments further allow de-activating selected AI modules in response to specific events. In one such example, a set of active AI modules includes a module targeted at processes that do not interact with a user. Some embodiments may de-activate the respective module in response to target entity 24 exposing a user interface.

Figure 7:
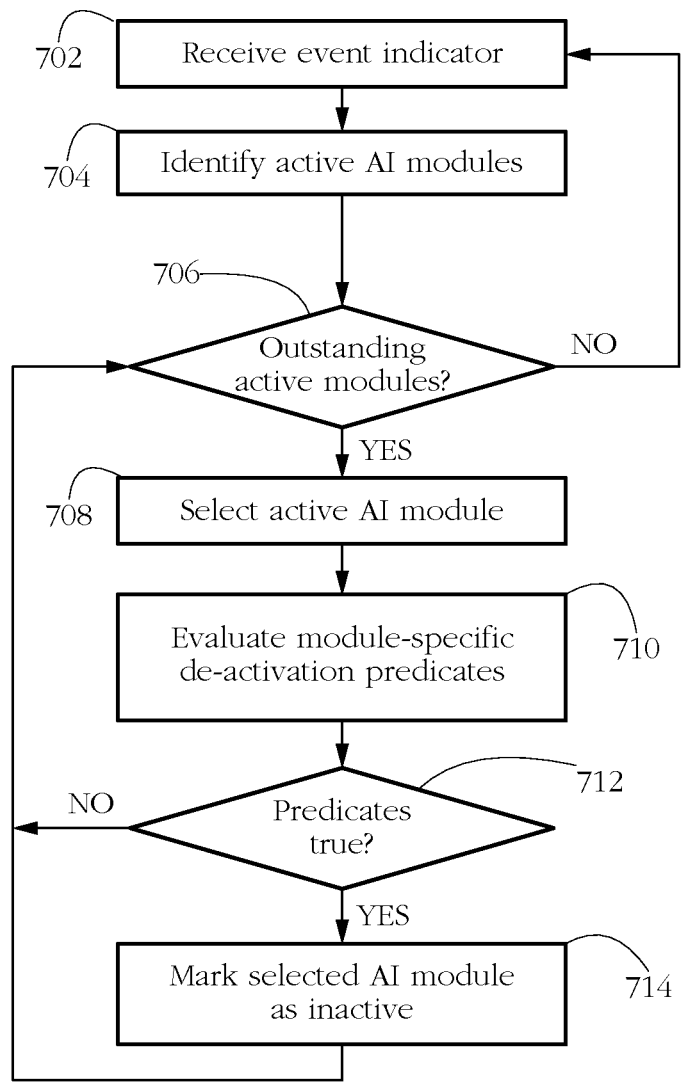
FIG. 7 shows another exemplary sequence of steps performed by the module activation engine according to some embodiments of the present invention.

FIG. 7 shows an exemplary sequence of steps performed by engine 38 to de-activate AI modules. In response to an event notification (a step 702), in a step 704 engine 38 may identify active AI modules, for instance according to an activation bitmap associated with the respective target entity, as described above. A sequence of steps 706-708 may cycle through all currently active AI modules. A step 710 may evaluate a set of module-specific de-activation predicates, i.e., verify whether a set of conditions are met for de-activating the selected, currently active AI module. Such de-activation predicates may be included, for instance, in module configuration file 45 associated with the respective AI module. When de-activation conditions are satisfied (a step 712 returns a YES), in a step 714 engine 38 may de-activate the selected AI module. Step 714 may comprise toggling a bit corresponding to the respective AI module in a module activation bitmap maintained by malware detector 44. In some embodiments, module de-activation may further trigger de-activating some feature extractors 42 charged with providing input data for the respective AI module.

Figure 8:
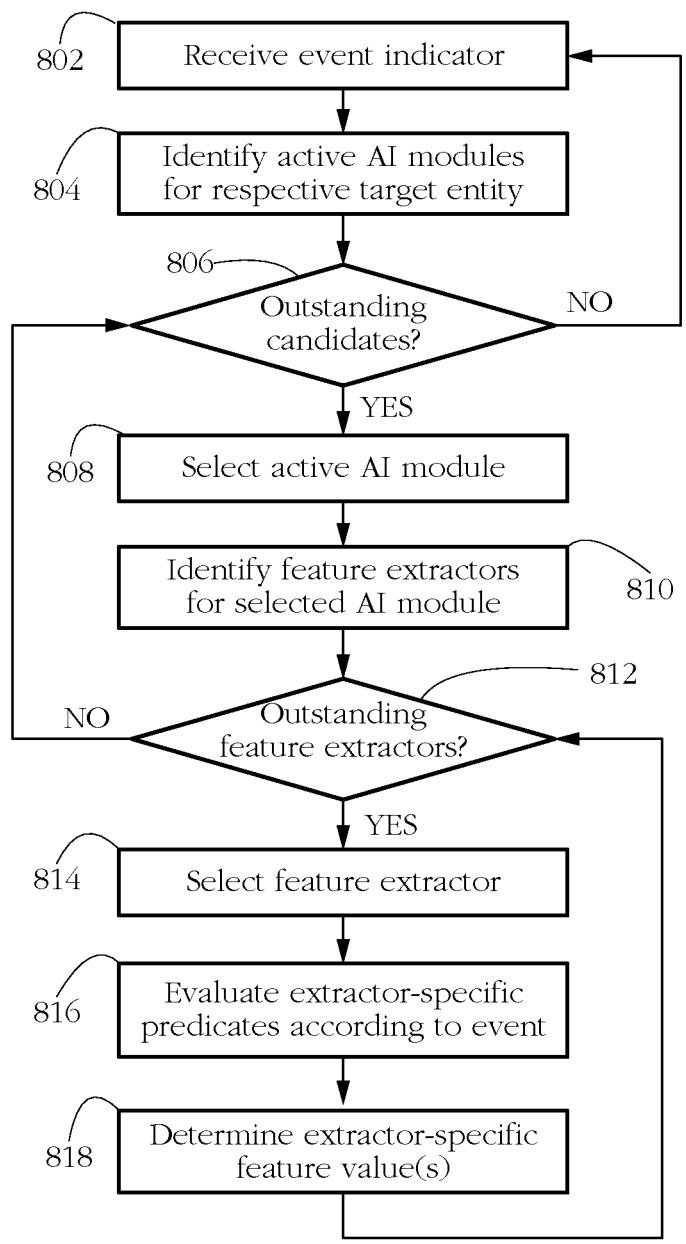
FIG. 8 shows an exemplary sequence of steps performed by a set of feature extractors according to some embodiments of the present invention.

FIG. 8 shows an exemplary sequence of steps performed by feature extractors 42 to provide input for AI modules 50 according to some embodiments of the present invention. A step 802 receives an event notification dispatched by event dispatcher 36 and identifies a target entity causing the occurrence of the respective event. A step 804 may then identify currently active AI modules associated with the respective target entity, for instance by looking up a module activation bitmap managed by malware detector 44, as described above. A further sequence of steps 806-808 may cycle through all identified active AI modules. For each active AI module, a step 810 may identify a subset of feature extractors providing input to the respective AI module. In some embodiments, feature extractors 42 associated with an AI module are specified in module configuration file 45 of the respective AI module.

A sequence of steps 812-814 may then cycle through all identified feature extractors. For each feature extractor, a step 816 may evaluate a respective predicate according to the event notified in step 802. Predicates may reference various attributes of the respective event and/or attributes of target software entity 24 causing the respective event. In a further step 818, the selected feature extractor 42 may determine feature value(s) 53 according to the evaluated predicates and write values 53 them to master feature vector 60 and/or to module-specific feature vector 52 of the respective AI module.

In one such example of feature extraction, step 802 detect a file read event. Step 810 further identifies a feature extractor 42 configured to determine whether target entity 24 has accessed a password file associated with the Chrome® browser from Google, Inc. An exemplary feature extractor predicate may comprise, for instance, determining whether a path of the file accessed by the detected read event coincides with the location of a Chrome® password file. When yes, the respective feature extractor may set the respective feature value 53 to 'YES'/TRUE.

In some embodiments, AI modules 50 are executed only sporadically, when triggered by specific events and/or when specific execution conditions are satisfied. A trigger herein denotes a condition for executing a particular AI module. The respective condition may be formulated as a set of predicates involving various event attributes and/or attributes of a respective target software entity. A simple exemplary trigger comprises an occurrence of a specific type of event, herein deemed a trigger event. More sophisticated triggers may involve multiple trigger events. In one such example, an AI module is executed only when target entity 24 causes a first event and also a second event (for instance, a target process spawns a child and the child process then writes a file to disk). The respective trigger events may need to occur in a specific order, etc. Triggers are typically module-specific, but in some embodiments a single trigger may cause the execution of multiple AI modules. In some embodiments, a set of optimal trigger events associated with each AI module 50 are determined via a process of machine learning as described below. In response to such training, a computer-readable specification of the module-specific triggers including trigger event types and associated trigger predicates, may be included for instance in module configuration file 45 (FIG. 3).

Figure 9:
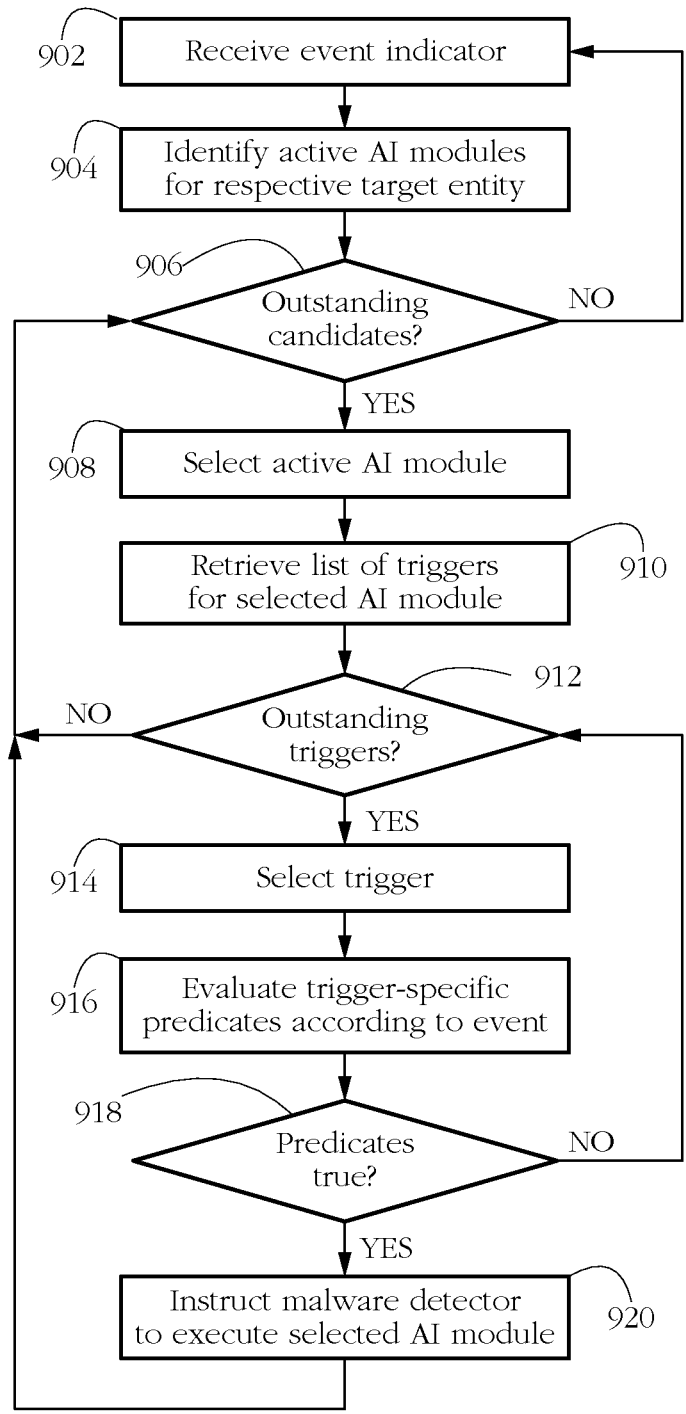
FIG. 9 shows an exemplary sequence of steps performed by a trigger engine according to some embodiments of the present invention.

In some embodiments, a trigger engine 40 receives event notifications from event dispatcher 36 and selectively triggers execution of various AI modules 50. FIG. 9 shows an exemplary sequence of steps carried out by trigger engine 40 according to some embodiments of the present invention. A step 902 receives an event indicator from dispatcher 36 and identifies target entity 24 accordingly. In a further step 904, trigger engine 40 may identify AI modules 50 that are currently active for the respective target entity, for instance according to a module activation bitmap maintained by malware detector 44 as described above.

A sequence of steps 906-908 may then cycle through all currently active AI modules. For each active AI module 50, a step 910 may retrieve a list of triggers specific to the respective AI module, for instance by parsing module configuration file 45 associated with the respective module. A sequence of steps 912-914 may cycle through the identified triggers. For each such trigger, a step 916 may evaluate trigger-specific predicates according to the event detected in step 902 and/or further according to attributes of target entity 24, as per trigger specifications. When trigger predicates evaluate to true (i.e., a condition for triggering the respective AI module is satisfied), a step 920 may signal to malware detector 44 to execute the respective AI module on feature data determined for the target entity causing the event detected in step 902.

Trigger engine 40 may then move on to the next active AI module (steps 906-908). In some embodiments as illustrated, multiple AI modules 50 may be triggered by the same event. Also, the same AI module 50 may be executed multiple times during a lifetime of a target entity, for instance triggered by distinct occurrences of the same event or of other events listed as triggers for the respective AI module. However, by carefully choosing trigger events and AI module parameters via machine learning (see below), some embodiments keep computational costs low while achieving a relatively high malware detection rate and low rate of false positives.

Figure 10:
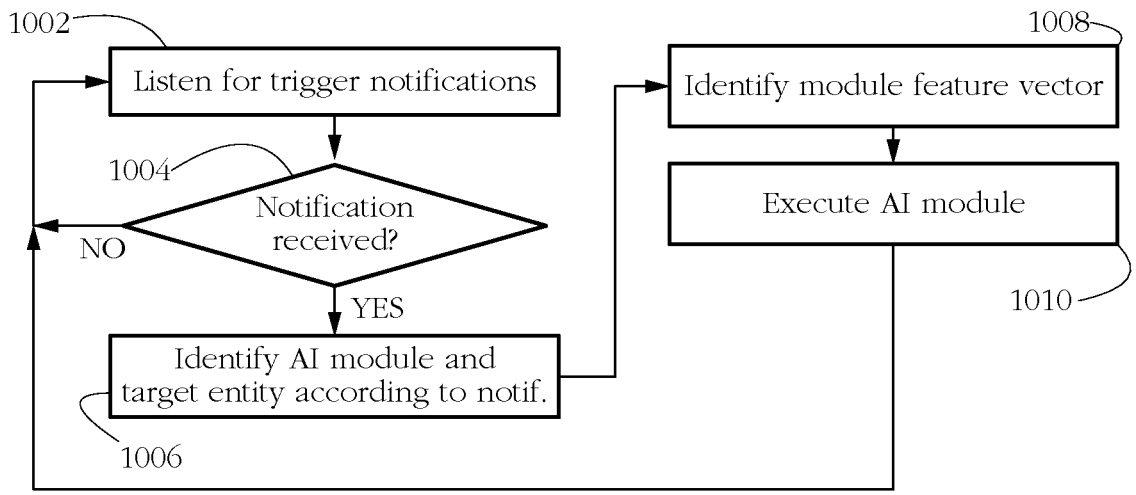
FIG. 10 shows an exemplary sequence of steps performed by a malware detector according to some embodiments of the present invention.

In some embodiments, malware detector 44 is configured to selectively execute AI modules 50 in response to notifications from trigger engine 40. FIG. 10 shows an exemplary sequence of steps performed by malware detector 44 according to some embodiments of the present invention. In response to a trigger notification (a step 1004 returns a YES), in a step 1006 detector 44 may identify the respective AI module and target entity according to the triggering notification. A further step 1008 may identify master feature vector 60 (or module-specific feature vector 52) determined for the respective target entity. In some embodiments, malware detector 44 may further determine whether all feature values 53 required as input by the respective AI module are available, and when no, prevent execution of the respective AI module. An alternative embodiment may supply a surrogate feature value when needed. Surrogates may be determined according to various methods, for instance default values, random values, previous determinations on target entities of the same type, etc.

A further step 1010 may execute the respective AI module and return to listening for trigger notification (step 1002). Executing comprises determining provisional verdict 54 (FIG. 3) indicating, for instance, a likelihood/probability that target entity 24 is malicious according to input feature vector 52. Step 1010 may include, for instance, carrying out a set of tensor multiplication operations involving feature vector 52 and a set of module-specific parameter values (e.g., neural network synapse weights, convolution masks, etc.), among others. Malware detector 44 may then return to listening for other trigger notifications.

In some embodiments, a cloud validation module 46 receives provisional verdict 54 from malware detector 44. Module 46 may then formulate a final verdict 56 indicating whether target entity 24 is malicious, or more generally, whether client system 12 comprises malware. In determining final verdict 56, module 46 may aggregate multiple individual provisional verdicts 54 determined by various AI modules 50 and may combine verdicts 54 with other malware-indicative data received from other components of computer security module 30 and/or from security server 14. Verdict 56 may then be used by other components of security module 30, for instance to carry out malware mitigation measures such as quarantining target entity 24, erasing malicious software, displaying a warning to a user of client device 12, etc.

In some embodiments, cloud validation module 46 forwards verdict 54 to security server 14 (see e.g., FIG. 1), together with additional data such as a copy of module-specific feature vector 52 and/or of master feature vector 60. Server 14 may then carry out additional malware-detection procedures/evaluations and communicate a result of such evaluations back to cloud validation module 46. For instance, server 14 may provide another provisional verdict that may support or reverse verdict 54 received from malware detector 44. In other exemplary embodiments, a record of provisional verdicts 54 and associated feature vectors is kept by server 14 for anti-malware research and/or early detection of emerging threats. Such information may be stored in and selectively retrieved from a security database 20 (FIG. 1).

Some embodiments may employ such collaboration between client device 12 and security server 14 for a dynamic and seamless provisioning of new AI modules 50 to client device 12. After new AI modules are developed and trained, they may be deployed to client devices 12*a-d* and integrated into the local instance of malware detector 44 without suspending the execution of security module 30 or affecting the operation of existing modules. New AI modules may be activated in a provisional "testing" state wherein any verdict they provide is first sent to server 14 for validation before being considered in determining final verdict 56. Server 14 may compare the respective provisional verdict against similar submissions from other client devices 12*a-d* and determine for instance whether the output of the new AI module meets some performance criterion. The newly installed AI module may be transitioned from the "testing" to a "normal" state in response to successfully passing performance tests.

In preparation for using AI modules 50, some embodiments employ various machine learning strategies and procedures to train modules 50 on corpora of training software samples, which may include known malicious and/or benign samples. Since training typically involves high computational costs, it may be carried out by a dedicated training system, for instance forming a part of security server 14. Said AI training system may comprise specialized hardware, such as a dedicated array of processors (e.g., graphics processing units-GPUs) for executing AI modules 50.

In one exemplary training scenario, each software sample of a training corpus may be executed in a testing environment such as a set of virtual machines mimicking hardware and/or software configurations of various client devices 12*a-d*. The testing environment may comprise an instance of event detectors 32 and/or event processors 34. However, instead of using an event dispatcher as shown above, testing instances of event detectors 32 and/or processors 34 may output event indicators to an event log, which may be implemented using any data format known in the art (e.g., a JSON file). For each event, the event log may thus record a set of attribute values characterizing the respective event. Each event log capturing the behavior of a software sample may be further annotated with an expected verdict indicating for instance whether the respective training sample is benign or malicious.

Figure 11:
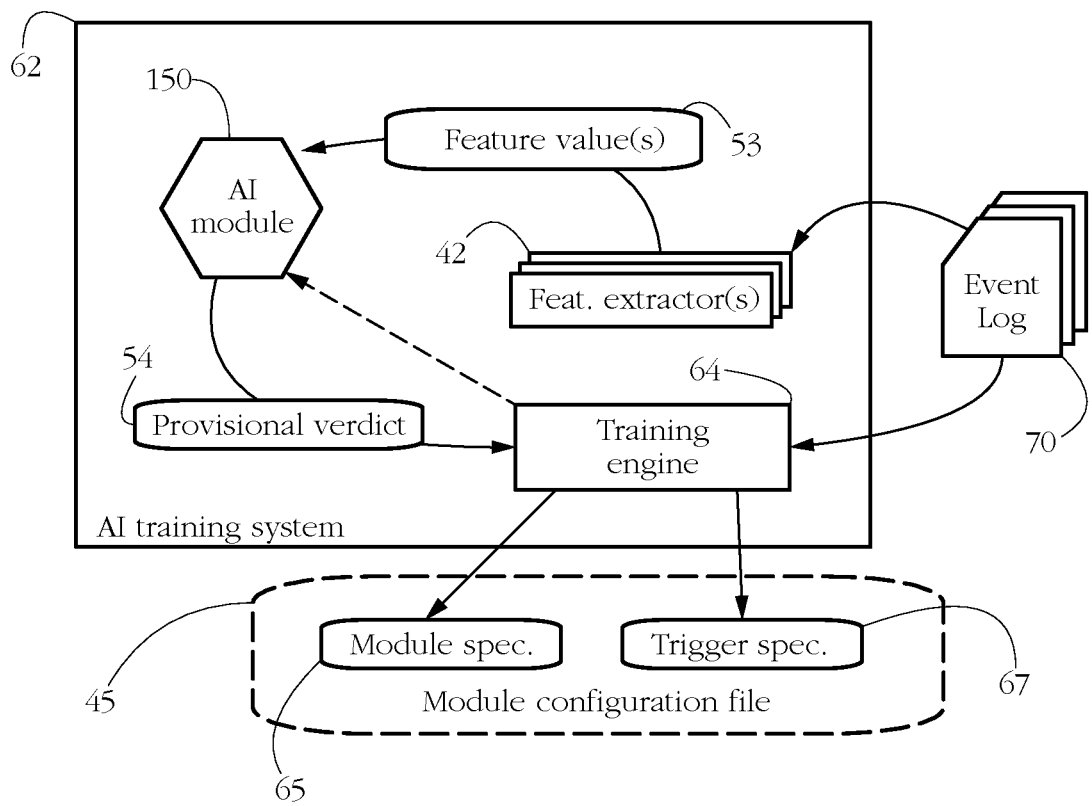
FIG. 11 illustrates an exemplary AI training system according to some embodiments of the present invention.

In response to determining a corpus of event logs, some embodiments may replay the respective event logs to an AI training system 62 as illustrated in FIG. 11. Components shown in FIG. 11 may be embodied for instance as computer programs executing on security server 14. AI module 150 represents a module currently undergoing training and may generically represent any of AI modules 50 in FIG. 3. AI module 150 may comprise any AI system, such as a set of artificial neural networks having any architecture known in the art. AI module 150 is configured to receive a feature vector characterizing a respective software sample and to determine provisional verdict 54 indicating whether the respective sample is malicious according to the received feature vector. A set of feature extractors 42 populate the feature vector with values 53 determined according to event specifications read from an event log 70. Feature extractors 42 are described in detail above, in relation to FIGS. 3, 5, and 8. A training engine 64 is configured to carry out a machine learning procedure for training AI module 150. Training herein comprises presenting AI module 150 with a variety of training inputs and adjusting a set of parameters of module 150 according to the outputs that the respective inputs produce. For each input, some embodiments may compute a value of a utility function (sometimes known in the art as a loss) according to the respective output and/or input, and adjusting module parameters according to the computed utility value, aiming for maximizing (or in some cases, minimizing) the utility function. In one example wherein AI module 150 comprises a neural network, adjustable parameters may include a set of synapse weights, while the utility function may quantify a departure of the current output (provisional verdict 54) from an expected or desired output (e.g., a label of clean/malicious associated with the respective sample/event log 70). Some known flavors of training include supervised, unsupervised, self-supervised, and reinforcement learning, among others. In some embodiments, the number of adjustable parameters of a typical AI module 150 may vary from several hundred to several million.

Figure 12:
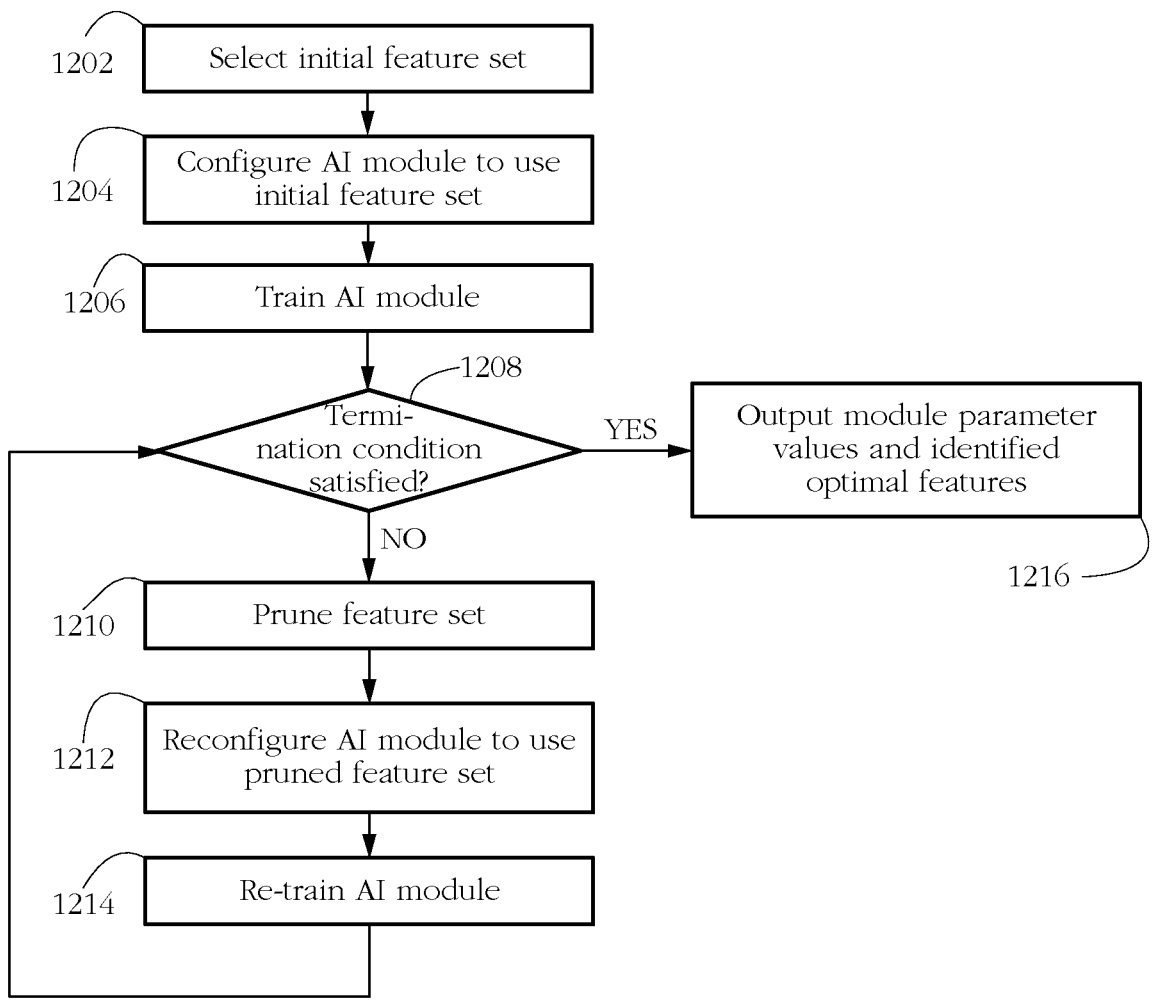
FIG. 12 shows an exemplary procedure for training an AI module according to some embodiments of the present invention.

FIG. 12 shows an exemplary sequence of steps performed by engine 64 to train AI module 150 according to some embodiments of the present invention. When AI module 150 is first conceived, it may be configured to process an initial set of features of a target entity. The respective set of features may be subsequently pruned during training, to arrive at a definitive feature set used in production. A sequence of steps 1202-1204 selects an initial set of features and sets up module 150 to use the respective set of features. AI module 150 is then trained on a corpus of software samples/event logs in a step 1206. Training may include, for each training sample/event log 70 in the corpus, determining a feature vector 52, processing the respective feature vector to produce verdict 54, determining a utility according to verdict 54, and adjusting parameters of module 150 in the direction of maximizing (or minimizing) the respective utility. In some embodiments, feature vectors used in training comprise feature values corresponding to the end of life of the respective training sample. An exemplary utility function may quantify a departure of verdict 54 from a true verdict (e.g., clean or malicious) of the respective sample, wherein the true verdict may be specified in event log 70. Step 1206 may be repeated for a pre-determined number of training epochs, and/or until a performance criterion is satisfied.

In some embodiments, AI module 150 may be further optimized in a process of feature selection, which may be iterative as illustrated. The feature selection process may continue until a termination condition is satisfied (a step 1208 returns a YES). An exemplary termination condition may be formulated according to a performance measure (e.g., malware detection rate, rate of false positives, etc.) and further according to a computational cost of executing AI module 150. Some embodiments rely on the observation that both the computational burden and the detection performance of AI-based detectors decrease when the size of the feature vector decreases. Therefore, some embodiments strive to achieve a balance in reducing the size of the feature vector without compromising the detection rate.

Feature selection may comprise pruning the current feature set, re-configuring AI module 150 to use the reduced feature set, and re-training the resulting modified AI module (a sequence of steps 1210-1212-1214). Step 1210 may implement any feature selection method known in the art, for instance discarding a subset of features which are deemed least reliable in correctly discerning malicious from clean samples. Such features may be selected according to a statistic of feature values evaluated over the entire training corpus. Other criteria for discarding features may include a computational cost of evaluating the respective features, an availability of the respective feature on selected device types, etc. Re-training AI module 150 may proceed similarly to step 1206 described above, albeit with a different feature vector lacking values of the discarded features.

When feature optimization is complete (step 1208 returns a YES), in a step 1116 training engine 64 may output a module specification 65 comprising a specification of the trained AI module, for instance in the form of a set of optimized module parameter values (e.g., synapse weights) determined in training. The module specification may further include an identifier of the optimal features determined via feature selection (or alternatively, identifiers of feature extractors 42 for evaluating the respective features) and their ordering or position within the feature vector.

Figure 13:
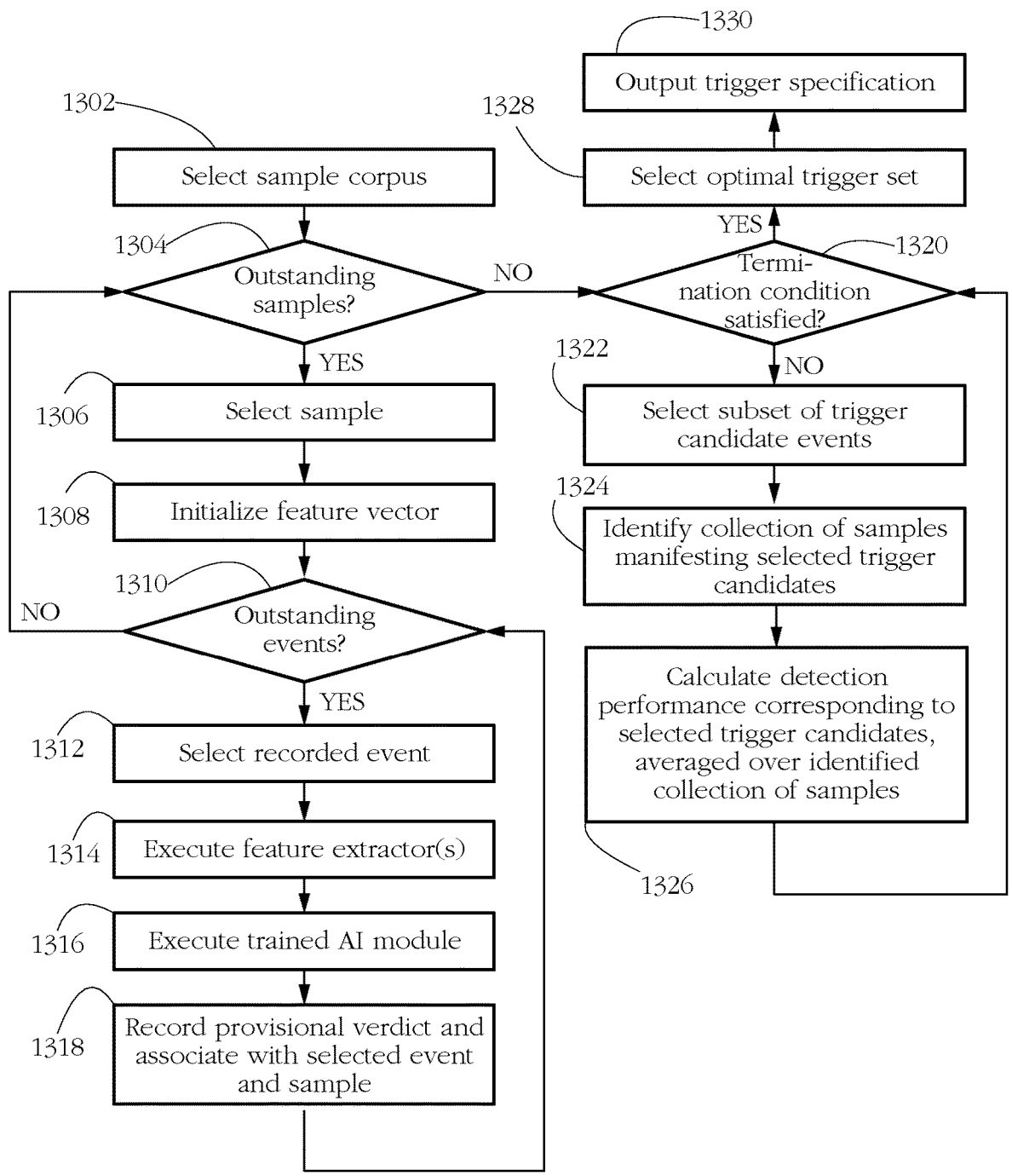
FIG. 13 shows an exemplary sequence of steps performed by the AI training system to identify optimal trigger events according to some embodiments of the present invention.

In response to training AI module 150, some embodiments may proceed to identifying a set of trigger events for executing the respective module. FIG. 13 shows an exemplary sequence of steps performed by training engine 64 for trigger identification. A step 1302 may identify a training corpus of software samples, for instance the same corpus used for training AI module 150 as described above. A sequence of steps 1304-1306 may then cycle through the respective training samples. For each training sample embodied for instance by event log 70, a step 1308 may initialize the feature vector of the respective AI module. For each event generated by the respective training sample (steps 1310-1312), a step 1314 may identify and execute a set of feature extractors 42 to populate the feature vector, as described above in relation to FIG. 8. As such, step 1314 may comprise evaluating extractor-specific predicates according to the respective event, etc. A sequence of steps 1316-1318 may then execute AI module 150 (already trained as described above) and record the respective verdict, associating it with the current event selected in step 1312 and training sample selected in step 1306.

In some embodiments using event logs as described herein, verdicts are computed in the order of occurrence of their respective associated events, thus imitating the behavior of the malware detector on a client device. By executing the trained AI module at various stages during the lifetime of each training sample, some embodiments monitor how the input (feature vector) and output (provisional verdict) of module 150 change in response to various events, which allows determining an optimal set of triggers.

By the time all training samples are processed (step 1304 returns a NO), training engine 64 will have gathered a relatively large dataset associating potential trigger events with verdicts produced by AI module 150 in response to the respective events, for each training sample. In a cycle of steps 1320-1322-1324-1326, some embodiments may then select various subsets of trigger candidates from the event-verdict association dataset, and for each such subset, compute a detection performance measure for the selected event subset, averaged over multiple training samples (e.g., over the entire training corpus).

Various triggering strategies may be optimized in this manner. In a simple example, the illustrated flowchart may determine a single optimal trigger event, i.e., a single optimal stage/moment during a lifetime of a monitored entity, so that executing AI module 150 at that particular stage would yield the best chance of correctly detecting malware in the respective entity. A more sophisticated trigger choice may comprise selecting multiple optimal triggers. Some embodiments rely on the observation that a particular trigger event may not occur in all instances of a target entity 24, for instance because the respective trigger event may not occur on a type of device that entity 24 is currently executing on, or that the respective trigger event may not occur in a particular geolocation, network domain, time interval, etc. Hence, relying on a single type of trigger event may accidentally cause a failure to trigger the respective AI module. Some embodiments therefore choose multiple optimal triggers so that, for instance, the respective AI module is triggered in response to an occurrence of either one of the selected optimal triggers. An additional optimization step may take into consideration the count of optimal trigger events, relying on the observation that more triggers are likely to improve the detection rate, but with the downside of an increased computational cost. An optimal trigger set may then be selected so that it performs satisfactorily over the training corpus, while keeping computational costs acceptably low.

In yet another exemplary triggering strategy, some embodiments may choose a set of trigger events so that the respective AI module will be triggered only when all the respective trigger events occur during execution of a target software entity. Other triggering strategies that may be optimized as shown herein include an example wherein a set of trigger events must occur in a pre-determined order for the respective AI module to be executed. A skilled artisan will know that these trigger choices are only exemplary and that the present description may be adapted to other choices without departing from the scope of the present invention.

In some embodiments, a step 1322 selects a subset of trigger event candidates. An exemplary subset consists of a single event. Exemplary criteria for selection include a triggering strategy (see discussion above) and a count of training samples manifesting the respective trigger candidate(s). Some embodiments use a threshold to prevent selection of excessively rare events and/or excessively frequent events as trigger candidates, based on an observation that they do not make reliable triggers-rare events may fail to trigger execution of the respective AI module, and frequent events may not be selective and/or malware-indicative.

A further step 1324 may identify a collection of training samples manifesting the selected trigger candidate events. In the simple example of a single trigger, engine 64 may select all training samples in the corpus having caused at least one occurrence of the selected candidate trigger. In another example wherein the triggering strategy comprises executing the respective AI module in response to either one of a plurality of trigger events, engine 64 may select all training samples in the corpus having caused either one of the selected trigger candidate events. Training samples may be further selected according to other criteria, such as entity type (e.g., portable executables vs. Microsoft Word® files), device type (e.g., smartphone vs. personal computer), etc.

A step 1326 then determines a performance measure characterizing the selected subset of trigger candidates, evaluated/averaged over the selected collection of training samples. Exemplary performance measures include a true detection rate, a false positive rate, a false negative rate, a precision, a recall, or a combination thereof. For instance, some embodiments may determine a detection performance measure according to an $F_1$ score:

$$\langle F_1 \rangle_\Sigma = \left\langle \frac{2}{P^{-1} + R^{-1}} \right\rangle_\Sigma = \left\langle \frac{2t_p}{2t_p + f_p + f_n} \right\rangle_\Sigma, \qquad [1]$$

wherein $\Sigma$ denotes the collection of training samples identified in step 1324, brackets denote evaluating or averaging over $\Sigma$, P denotes precision (fraction of correct malicious verdicts out of all malicious verdicts), R denotes recall (fraction of correct malicious verdicts out of all malicious samples), $t_p$ denotes a count of true positives (correct malicious verdicts), $f_p$ denotes a count of false positives (incorrect malicious verdicts), and $f_n$ denotes a count of false negatives (incorrect clean verdicts). All quantities in Eq. [1] are determined using provisional verdicts determined in steps 1316-1318 and associated with the current selected candidate triggers (step 1322) and training samples (step 1324), and therefore are characteristic of the respective candidate triggers. A skilled artisan will know that evaluating/averaging a performance measure over a collection of training samples (e.g., $\Sigma$ in Eq. [1]) is equivalent to evaluating/averaging the respective performance measure over a set of provisional verdicts associated with the respective samples.

When a termination condition for selecting trigger candidates is satisfied (step 1320 returns a YES), in a step 1328 training engine 64 may select an optimal trigger set according to the detection performance of various candidate trigger subsets evaluated in steps 1320-1326. For instance, some embodiments may select as optimal triggers the subset of trigger candidates showing the best detection performance (e.g., highest $F_1$ score) over the training corpus.

A further step 1330 may output a trigger specification 67 (FIG. 11) comprising a specification of the identified optimal trigger events for use by trigger engine 40 as described above in relation to FIG. 9. In some embodiments, trigger specification 67 further includes a set of trigger predicates, each predicate comprising a condition for triggering the respective AI module in response to detecting the respective trigger event (e.g., step 916 in FIG. 9). In some embodiments, module specification 65 and trigger specification 67 form a part of module configuration file 45 provisioned to protected client devices 12a-d. Step 1330 may therefore be seen as configuring malware detector 44. Such configuration may be performed dynamically, since trigger specifications 67 may be kept up to date and delivered to clients independently of other components of security module 30.

Figure 14:
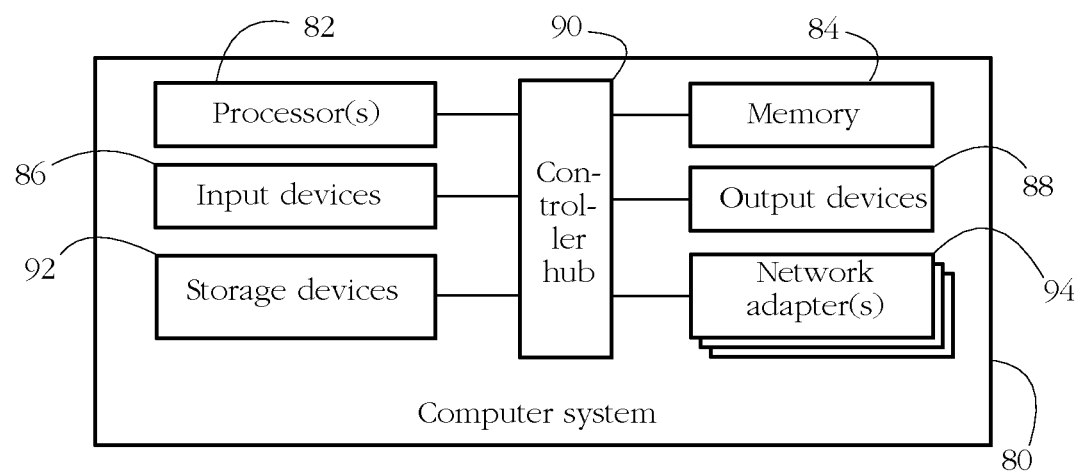
FIG. 14 shows an exemplary hardware configuration of a computer system programmed to execute some of the methods described herein.

FIG. 14 shows an exemplary hardware configuration of a computer system 80 programmed to execute some of the methods described herein. Computer system 80 may represent any client device 12a-d, security server 14, as well as AI training system 62. The illustrated computing appliance is a personal computer; other devices such as servers, mobile telephones, tablet computers, and wearables may have slightly different configurations. Processor(s) 82 comprise a physical device (e.g. microprocessor, multi-core integrated circuit formed on a semiconductor substrate) configured to execute computational and/or logical operations with a set of signals and/or data. Such signals or data may be encoded and delivered to processor(s) 82 in the form of processor instructions, e.g., machine code.

Processor(s) 82 are generally characterized by an instruction set architecture (ISA), which specifies the respective set of processor instructions (e.g., the x86 family vs. ARM® family), and the size of registers (e.g., 32 bit vs. 64 bit processors), among others. The architecture of processor(s) 82 may further vary according to their intended primary use. While central processing units (CPU) are general-purpose processors, graphics processing units (GPU) may be optimized for image/video processing and some forms of parallel computing. Processors 82 may further include application-specific integrated circuits (ASIC), such as Tensor Processing Units (TPU) from Google®, Inc., and Neural Processing Units (NPU) from various manufacturers. TPUs and NPUs may be particularly suited for machine learning applications as described herein.

Memory unit 84 may comprise volatile computer-readable media (e.g. dynamic random-access memory—DRAM) storing data/signals/instruction encodings accessed or generated by processor(s) 82 in the course of carrying out operations. Input devices 86 may include computer keyboards, mice, and microphones, among others, including the respective hardware interfaces and/or adapters allowing a user to introduce data and/or instructions into computer system 80. Output devices 88 may include display devices such as monitors and speakers among others, as well as hardware interfaces/adapters such as graphic cards, enabling the respective computing appliance to communicate data to a user. In some embodiments, input and output devices 86-88 share a common piece of hardware (e.g., a touch screen). Storage devices 92 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 94 enable computer system 80 to connect to an electronic communication network (e.g, network 15 in FIG. 1) and/or to other devices/computer systems.

Controller hub 90 generically represents the plurality of system, peripheral, and/or chipset buses, and/or all other circuitry enabling the communication between processor(s) 82 and the rest of the hardware components of computer system 80. For instance, controller hub 90 may comprise a memory controller, an input/output (I/O) controller, and an interrupt controller. Depending on hardware manufacturer, some such controllers may be incorporated into a single integrated circuit, and/or may be integrated with processor(s) 82. In another example, controller hub 90 may comprise a northbridge connecting processor 82 to memory 84, and/or a southbridge connecting processor 82 to devices 86, 88, 92, and 94.

The exemplary systems and methods described above allow efficiently detecting malicious software using artificial intelligence (AI). Conventional anti-malware software typically uses a set of heuristics (i.e., simple rules) to determine whether a software entity is malicious according to various data indicative of a behavior of the respective entity. For instance, security software may detect a set of hardware and/or software events caused by the execution of the target entity and look for behavior patterns commonly associated with malware. Some such events may be malware-indicative themselves; others indicate malice when co-occurring with other events.

A few modern security solutions employ AI technology (e.g., trained artificial neural networks) to detect malware. In some such examples, various characteristics of the target software are presented as input to a neural network classifier pre-trained to distinguish between clean and malicious software samples. Despite many advantages, AI technology comes with its own substantial technical challenges. For instance, a typical neural network classifier may be orders of magnitude more computationally expensive than a set of simple heuristics. Another challenge is the choice of input, since not all attributes of a target entity are equally informative in identifying malware. Furthermore, not all selected attributes may be available at all times and on all devices. Some attributes of a software entity may be substantially more expensive to evaluate than others. Yet another challenge is the extreme diversity and speed of evolution of malicious software, which makes any current choice of input features potentially obsolete in the face of emerging threats.

One conventional solution to these challenges involves increasing the size of the neural networks and associated input vectors. Some such classifiers end up using thousands of distinct attributes of the target entity. However, training and executing such large-size classifiers carries an important computational cost, which makes such solutions impractical for client devices with relatively limited resources, such as smartphones and wearables. Large classifiers are also difficult to update, since updating essentially entails re-training and delivering the whole re-trained classifier to clients.

Some embodiments of the present invention directly address some of these challenges. In contrast to using large classifiers and feature vectors, some embodiments employ relatively small AI modules. To counter the performance penalty plaguing small neural networks, some embodiments use multiple (e.g., dozens, hundreds) distinct AI modules, providing a sophisticated, multi-faceted view of the target entity. In one such example, each AI module 50 (FIG. 3) may process a distinct set of attributes/features of the target software. Some embodiments rely on the observation that computational costs associated with neural computation increase more than linearly with the size of the relevant neural networks, so that executing multiple small networks typically costs less than executing a single large one.

Some embodiments rely on further optimization strategies to reduce the computational overhead of security software. For instance, only a selected, relatively small subset of the available AI modules are activated (i.e., ready for execution) when monitoring each target entity. The selection of active AI modules may differ according to a type of target entity (e.g., portable executable vs. Microsoft Word® file), a type of client device (e.g., desktop computer vs. smartphone), or according to a current state or load of the respective client device, among others.

Furthermore, in some embodiments, the composition of a security toolkit (i.e., the count and selection of AI modules currently in use) changes dynamically during execution of the target software. To save memory and processor cycles, some AI modules may be turned off and on again according to behavioral cues such as specific events caused by the target entity. In one such example, an initial set of AI modules is activated at the launch of a target entity. In response to a particular action of the target entity, some of the initial AI modules may be de-activated, and others may be added to the toolkit.

Yet another optimization feature of some embodiments of the present invention comprises executing currently active AI modules only sporadically, in response to specific events herein deemed trigger events. Some embodiments rely on the observation that a feature vector may evolve during a lifetime of a monitored entity as the respective entity carries out its activity, so that the input to an AI module may not be equally malware-indicative at all times. Stated otherwise, there might be an optimal stage in the lifetime of the monitored entity (identified for instance by a trigger event) wherein executing the AI module is optimally informative as to the maliciousness of the respective entity. Such an optimal trigger may, for instance, provide a trade-off between early detection and reliable detection.

Some embodiments identify optimal triggers using a machine learning procedure by measuring the malware detection performance of a trained AI module at each of a set of candidate trigger points, averaged over a corpus of training samples as shown in detail above. In general, the procedure may identify multiple optimal trigger events. In some embodiments, having more than one trigger event signifies that the respective AI module will be triggered by an occurrence of either one of the respective trigger events (i.e., alternative triggers). In other embodiments, multiple triggers may indicate that the respective AI module will be executed only when all the respective trigger events have occurred. Some embodiments may further indicate an order in which trigger events have to occur in order for the respective AI module to be executed. Triggers may be specific to each AI module and further specific to each type of target software entity, device type, etc.

A modular architecture of the security software as described herein further facilitates a swift and seamless upgrade by incorporating newly developed AI modules and retiring older, less performant modules potentially without affecting the operation of other components of the security software. Such flexibility allows some embodiments to maintain a satisfactory level of detection performance in the face of new and emerging threats, while substantially reducing a time-to-market by avoiding a substantial overhaul of the current security solution and expensive re-training of large NN detectors. In one exemplary embodiment, new or upgraded AI modules may be deployed to client devices at any time, in the form of a module-specific configuration file including a specification of the respective AI module (e.g., a set of module parameter values such as synapse weights resulting from training) and a specification of a set of trigger events causing the selective execution of the respective AI module. The malware detector may instantiate the respective AI module as instructed in the module specification, may dynamically insert it into the current toolkit, and may selectively trigger its execution as instructed in the trigger specification. The same dynamic deployment strategy may apply to other aspects of the described security solution. For instance, the set of triggers and/or conditions for activating and de-activating a deployed AI module may be updated and delivered to clients on the fly, without influencing other components of the security software.

It will be clear to one skilled in the art that the above embodiments may be altered in many ways without departing from the scope of the invention. Accordingly, the scope of the invention should be determined by the following claims and their legal equivalents.

The invention claimed is:

1. A computer system comprising at least one hardware processor configured to:
   determine a trigger event for executing a malware-detecting artificial intelligence (AI) module, wherein determining the trigger event comprises:
      determining a plurality of provisional verdicts indicative of whether a training software entity is malicious, each verdict of the plurality of provisional verdicts associated with a distinct event of a plurality of events caused by an execution of the training software entity, and wherein determining each verdict comprises:
         updating a feature vector characterizing the training software entity according to the distinct event, and
         executing the AI module to determine a respective verdict according to the updated feature vector, and
      in response to determining the plurality of provisional verdicts, selecting the trigger event from the plurality of events according to the plurality of provisional verdicts; and
   in response to determining the trigger event, configure a malware detector to selectively execute another instance of the AI module in response to an occurrence of the trigger event, to determine whether a target software entity is malicious.

2. The computer system of claim 1, wherein the at least one hardware processor is further configured to:
   determine another trigger event for executing the AI module by selecting the other trigger event from the plurality of events according to the plurality of provisional verdicts; and
   configure the malware detector to selectively execute the other instance of the AI module in response to an occurrence of the other trigger event, to determine whether the target software entity is malicious.

3. The computer system of claim 1, wherein the at least one hardware processor is configured to determine each verdict of the plurality of provisional verdicts according to an order of occurrence of the plurality of events during the execution of the training software entity.

4. The computer system of claim 1, wherein determining the trigger event further comprises:
   determining a malware detection performance of the trigger event over a collection of training software entities, the malware detection performance determined according to another plurality of provisional verdicts, each verdict of the other plurality of provisional verdicts indicating whether a respective entity of the collection is malicious, each verdict of the other plurality of provisional verdicts associated with an occurrence of the trigger event during an execution of the respective entity; and
   selecting the trigger event from the plurality of training events further according to the malware detection performance of the trigger event.

5. The computer system of claim 4, wherein the at least one hardware processor is configured to determine the malware detection performance of the trigger event according to a count of true positive verdicts within the other plurality of provisional verdicts.

6. The computer system of claim 5, wherein the at least one hardware processor is configured to determine the malware detection performance of the trigger event according to:

$$\frac{2t_p}{2t_p + f_p + f_n},$$

wherein $t_p$ denotes the count of true positive verdicts, $f_p$ denotes a count of false positive verdicts, and $f_n$ denotes a count of false negative verdicts within the other plurality of provisional verdicts.

7. The computer system of claim 4, wherein the at least one hardware processor is configured to determine the malware detection performance of the trigger event according to a count of false positive verdicts within the other plurality of provisional verdicts, and further according to a count of false negative verdicts within the other plurality of provisional verdicts.

8. The computer system of claim 1, wherein configuring the malware detector comprises formulating a specification of the trigger event and transmitting the specification of the trigger event to a client device executing the malware detector.

9. The computer system of claim 8, wherein the specification of the trigger event further includes a specification of a trigger predicate comprising a condition for executing the other instance of the AI module in response to the occurrence of the trigger event.

10. The computer system of claim 1, wherein the malware detector comprises a plurality of detection modules including the other instance of the AI module, and wherein selectively executing the other instance of the AI module comprises selecting the other instance of the AI module for execution from the plurality of detection modules in response to the occurrence of the trigger event.

11. A computer security method comprising employing at least one hardware processor of a computer system to:
   determine a trigger event for executing a malware-detecting artificial intelligence (AI) module, wherein determining the trigger event comprises:
      determining a plurality of provisional verdicts indicative of whether a training software entity is malicious, each verdict of the plurality of provisional verdicts associated with a distinct event of a plurality of events caused by an execution of the training software entity, and wherein determining each verdict comprises:
         updating a feature vector characterizing the training software entity according to the distinct event, and
         executing the AI module to determine a respective verdict according to the updated feature vector, and
      in response to determining the plurality of provisional verdicts, selecting the trigger event from the plurality of events according to the plurality of provisional verdicts; and
   in response to determining the trigger event, configure a malware detector to selectively execute another instance of the AI module in response to an occurrence of the trigger event, to determine whether a target software entity is malicious.

12. The method of claim 11, further comprising employing the at least one hardware processor to:
  determine another trigger event for executing the AI module by selecting the other trigger event from the plurality of events according to the plurality of provisional verdicts; and
  configure the malware detector to selectively execute the other instance of the AI module in response to an occurrence of the other trigger event, to determine whether the target software entity is malicious.

13. The method of claim 11, comprising determining each verdict of the plurality of provisional verdicts according to an order of occurrence of the plurality of events during the execution of the training software entity.

14. The method of claim 11, wherein determining the trigger event further comprises:
  determining a malware detection performance of the trigger event over a collection of training software entities, the malware detection performance determined according to another plurality of provisional verdicts, each verdict of the other plurality of provisional verdicts indicating whether a respective entity of the collection is malicious, each verdict of the other plurality of provisional verdicts associated with an occurrence of the trigger event during an execution of the respective entity; and
  selecting the trigger event from the plurality of training events further according to the malware detection performance of the trigger event.

15. The method of claim 14, comprising determining the malware detection performance of the trigger event according to a count of true positive verdicts within the other plurality of provisional verdicts.

16. The method of claim 15, comprising determining the malware detection performance of the trigger event according to:

$$\frac{2t_p}{2t_p + f_p + f_n},$$

wherein $t_p$ denotes the count of true positive verdicts, $f_p$ denotes a count of false positive verdicts, and $f_n$ denotes a count of false negative verdicts within the other plurality of provisional verdicts.

17. The method of claim 14, comprising determining the malware detection performance of the trigger event according to a count of false positive verdicts within the other plurality of provisional verdicts, and further according to a count of false negative verdicts within the other plurality of provisional verdicts.

18. The method of claim 11, wherein configuring the malware detector comprises formulating a specification of the trigger event and transmitting the specification of the trigger event to a client device executing the malware detector.

19. The method of claim 18, wherein the specification of the trigger event further includes a specification of a trigger predicate comprising a condition for executing the other instance of the AI module in response to the occurrence of the trigger event.

20. The method of claim 11, wherein the malware detector comprises a plurality of detection modules including the other instance of the AI module, and wherein selectively executing the other instance of the AI module comprises selecting the other instance of the AI module for execution from the plurality of detection modules in response to the occurrence of the trigger event.

21. A non-transitory computer-readable medium storing instructions which, when executed by at least one hardware processor of a computer system, cause the computer system to:
  determine a trigger event for executing a malware-detecting artificial intelligence (AI) module, wherein determining the trigger event comprises:
    determining a plurality of provisional verdicts indicative of whether a training software entity is malicious, each verdict of the plurality of provisional verdicts associated with a distinct event of a plurality of events caused by an execution of the training software entity, and wherein determining each verdict comprises:
      updating a feature vector characterizing the training software entity according to the distinct event, and
      executing the AI module to determine a respective verdict according to the updated feature vector, and
    in response to determining the plurality of provisional verdicts, selecting the trigger event from the plurality of events according to the plurality of provisional verdicts; and
  in response to determining the trigger event, configure a malware detector to selectively execute another instance of the AI module in response to an occurrence of the trigger event, to determine whether a target software entity is malicious.

* * * * *